(12) United States Patent
Takamura et al.

(10) Patent No.: US 9,230,352 B2
(45) Date of Patent: Jan. 5, 2016

(54) INFORMATION PROCESSING APPARATUS, INFORMATION PROCESSING METHOD, AND COMPUTER PROGRAM PRODUCT

(75) Inventors: Seiichi Takamura, Saitama (JP); Noriyuki Yamamoto, Kanagawa (JP); Shinya Ohtani, Kanagawa (JP); Yasuharu Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 14/232,831

(22) PCT Filed: Jul. 25, 2012

(86) PCT No.: PCT/JP2012/004746
§ 371 (c)(1),
(2), (4) Date: Jan. 14, 2014

(87) PCT Pub. No.: WO2013/018325
PCT Pub. Date: Feb. 7, 2013

(65) Prior Publication Data
US 2014/0146052 A1    May 29, 2014

(30) Foreign Application Priority Data

Aug. 2, 2011 (JP) .................................. 2011-168974

(51) Int. Cl.
*G06T 11/20* (2006.01)
*G06T 11/40* (2006.01)
(Continued)

(52) U.S. Cl.
CPC .............. *G06T 11/206* (2013.01); *G06F 13/00* (2013.01); *G06Q 10/10* (2013.01); *G06Q 30/0201* (2013.01); *G06Q 50/01* (2013.01)

(58) Field of Classification Search
CPC ............ G06T 11/206; G06F 17/30696; G06F 17/3084; G06Q 10/10

USPC ............... 345/440, 440.1, 441, 442; 707/710, 707/E17.008, E17.002, E17.046, 737, 741, 707/E17.005, E17.028, E17.108, 999.005; 705/14.49, 319, 14.73; 715/771

See application file for complete search history.

(56) References Cited

U.S. PATENT DOCUMENTS

| 2008/0154889 A1* | 6/2008 | Pfeiffer ............................ 707/5 |
| 2009/0094286 A1* | 4/2009 | Lee et al. ................... 707/104.1 |

(Continued)

FOREIGN PATENT DOCUMENTS

| JP | 2005-260391 A | 9/2005 |
| JP | 2007-47902 A  | 2/2007 |

(Continued)

OTHER PUBLICATIONS

International Search Report issued Aug. 21, 2012 in PCT/JP2012/004746.

(Continued)

*Primary Examiner* — Jin-Cheng Wang
(74) *Attorney, Agent, or Firm* — Oblon, McClelland, Maier & Neustadt, L.L.P.

(57) ABSTRACT

An information processing apparatus, method and computer program product cooperate to provide graphical trends of posts regarding a posting subject and additional information. The apparatus includes a collector that collects posts regarding a posting subject that proceeds over time. A counting unit is included that counts a number of collected posts for each of different classes of posts. A display controller causes graphs to be displayed along a time-axis illustrating time-wise trends in the posts for each class together with additional information. The additional information is information that includes at least one of posts at respective times and information regarding the posting subject.

20 Claims, 17 Drawing Sheets

(51) Int. Cl.
    *G06F 13/00*     (2006.01)
    *G06Q 10/10*     (2012.01)
    *G06Q 30/02*     (2012.01)
    *G06Q 50/00*     (2012.01)

(56) References Cited

U.S. PATENT DOCUMENTS

| | | | |
|---|---|---|---|
| 2010/0119053 A1* | 5/2010 | Goeldi | 379/265.09 |
| 2010/0121707 A1* | 5/2010 | Goeldi | 705/14.49 |
| 2012/0278327 A1* | 11/2012 | Nakazawa et al. | 707/737 |
| 2013/0041905 A1* | 2/2013 | Davies | 707/748 |
| 2014/0344243 A1* | 11/2014 | Hao et al. | 707/710 |

FOREIGN PATENT DOCUMENTS

| | | |
|---|---|---|
| JP | 2008-283412 A | 11/2008 |
| JP | 2010-55411 A | 3/2010 |
| JP | 2010-226630 A | 10/2010 |

OTHER PUBLICATIONS

Yasuhiro Kawai, et al., "Interfaces of Movie Sharing that Improves a Sense of Unity on Asynchronous Communications", IPSJ SIG Technical Reports, vol. 2008, No. 50, May 21, 2008, pp. 31-36 (with English abstract).

Satoshi Nakamura, et al., "Can Social Annotation Support Users in Evaluating the Trustworthiness of Video Clips?", WICOW'08 Proceedings of the $2^{nd}$ ACM workshop on Information credibility on the web, ACM, (Oct. 30, 2008), pp. 59-62.

\* cited by examiner

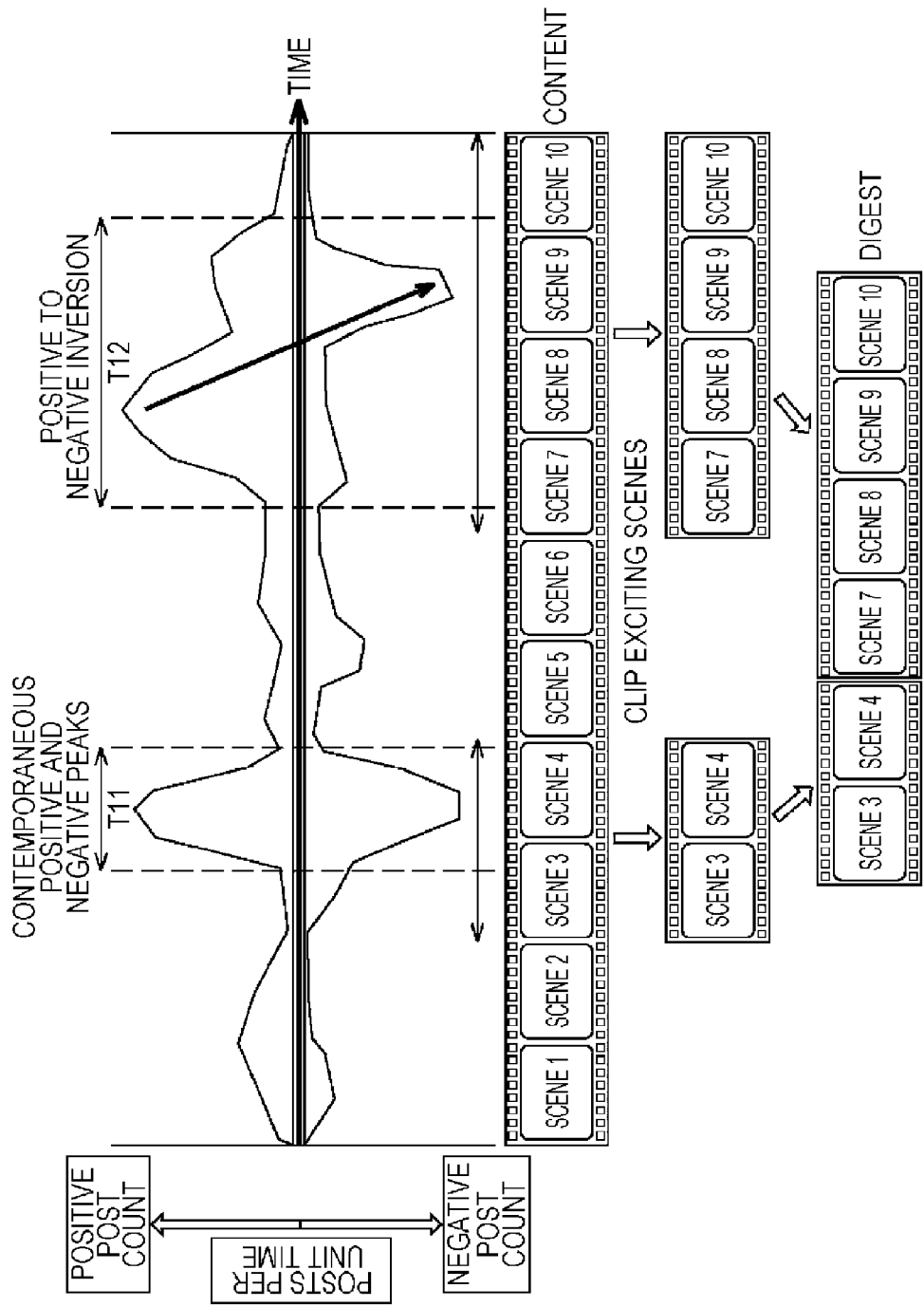

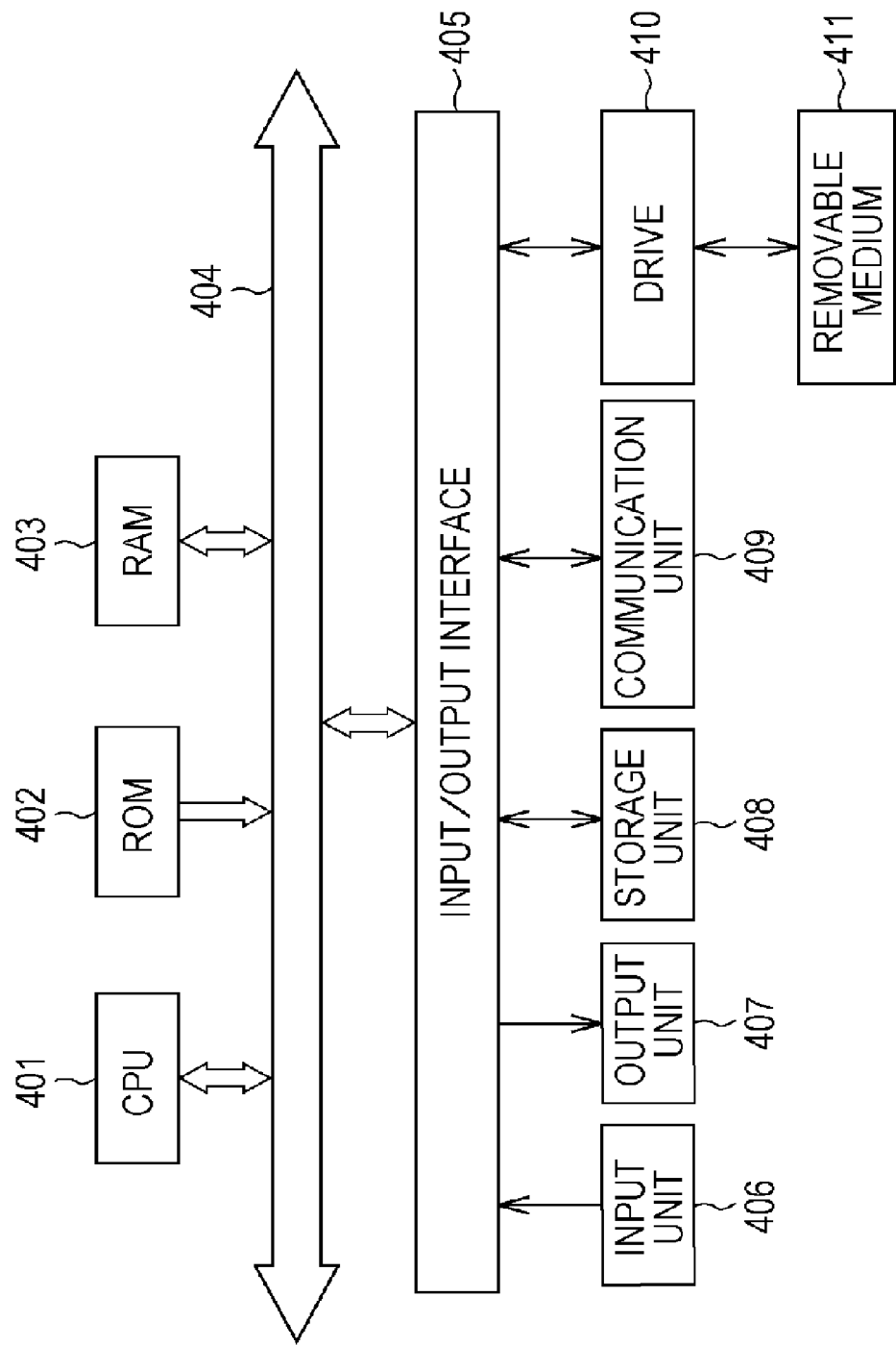

INFORMATION PROCESSING APPARATUS, INFORMATION PROCESSING METHOD, AND COMPUTER PROGRAM PRODUCT

TECHNICAL FIELD

The present technology relates to an information processing apparatus, an information processing method, and a computer program product, and more particularly, relates to an ideal information processing apparatus, information processing system, information processing method, and computer program product used to display analysis results for user posts regarding media content or an event.

BACKGROUND ART

Previously, there has been proposed technology called live chat, which is designed such that viewers communicate with each other while viewing a broadcast program by posting their impressions, opinions, or other response to the program into an interface such as a message board or chat window. (see PTL 1, for example).

CITATION LIST

Patent Literature

PTL 1: Japanese Unexamined Patent Application Publication No. 2008-283412

SUMMARY OF INVENTION

Technical Problem

However, with the above live chat, it has not been possible to easily ascertain how posts are trending while a program is being broadcast.

Thus, the present technology is configured to make it possible to easily ascertain trends in posts regarding a posting subject that proceeds over time, such as video content.

Solution to Problem

An information processing apparatus of an aspect of the present technology includes a collector that collects posts regarding a posting subject that proceeds over time;

a counting unit that counts a number of collected posts for each of different classes of posts; and a display controller that causes a plurality of graphs to be displayed along a time-axis illustrating time-wise trends in the posts for each class together with additional information, said additional information being information that includes at least one of posts at respective times and information regarding the posting subject. The apparatus may be implemented in a single unit, or with selected features being implemented with cloud resources According to one aspect, the additional information includes a scene image of a video, and the display controller causes the scene image to be displayed at a peak of at least one of the plurality of graphs.

According to another aspect, the display controller causes a 3D image to be displayed, and the time axis of the plurality of graphs is set in a depth direction of the 3D image.

According to another aspect, the display controller causes a time-wise trend in a positive post count to be displayed, and a time-wise trend in a negative post count to be displayed, and includes a number of posts that include a predetermined keyword or a post feature or attribute of a post as a condition for being included, said positive post count includes posts indicating a positive commentary, and said negative post counts includes posts indicating a negative commentary.

According to another aspect, a content editor is included that generates a content digest of content segments that occur during periods of time when a rate of change of a time-wise trend exceeds a predetermined threshold.

According to another aspect, a content analyzer is included that analyzes features of content associated with the posts, and provides input to said display controller that displays a graph of time-based trends in features of the content.

According to another aspect, a first feature of content is an audio feature, and a second feature of content is a video feature.

According to another aspect, the apparatus further includes an interface that sends an analysis request to a remote device have a content analyzer that analyzes features of content associated with the posts, and provides post analysis and features of content to the display controller, wherein the display controller causes a graph to be displayed of time-based trends in the features of the content.

According to another aspect, a first feature of content is an audio feature, and a second feature of content is a video feature.

According to another aspect, said additional information is one of image data, text data and video data.

According to another aspect, the display controller updates the additional information during a post analysis interval during which posts for a particular topic are collected.

According to another aspect, the display controller causes a displayed scrolling of at least one graph laterally as time advances to provide an opportunity for real time monitoring of responses to content and changing of content based on a time-wise trend to the posting subject.

According to an information processing method embodiment, the embodiment includes collecting posts regarding a posting subject that proceeds over time;

counting a number of collected posts for each of different classes of posts; and controlling a display controller to display along a time axis a plurality of graphs illustrating time-wise trends in the post count for each class together with additional information, said additional information being information that includes at least one from among posts at respective times and information regarding the posting subject.

According to an information processing method embodiment, the embodiment includes receiving posts regarding a posting subject that proceeds over time and additional information;

analyzing the posts and categorizing respective posts into different classes of posts;

determining a number of collected posts as a post count for each of the different classes of posts;

transmitting an analysis result to a remote device that causes a display along a time axis a plurality of graphs illustrating time-wise trends in the post count together with additional information, said additional information being information that includes at least one from among posts at respective times and information regarding the posting subject.

According to a non-transitory computer readable medium embodiment, the medium has instructions stored thereon that when executed by a processing circuit performs an information processing method, the method comprising:

collecting posts regarding a posting subject that proceeds over time;

counting the number of collected posts for each of different classes of posts;

controlling a display controller to display along a time axis a plurality of graphs illustrating time-wise trends in the post count for each class together with additional information, said additional information being information that includes at least one from among posts at respective times and information regarding the posting subject.

According to a non-transitory computer readable medium embodiment, the medium has instructions stored thereon that when executed by a processing circuit performs an information processing method, the method comprising: receiving posts regarding a posting subject that proceeds over time and additional information;

analyzing the posts and categorizing respective posts into different classes of posts;

determining a number of collected posts as a post count for each of the different classes of posts;

transmitting an analysis result to a remote device that displays along a time axis a plurality of graphs illustrating time-wise trends in the post count together with additional information, said additional information being information that includes at least one from among posts at respective times and information regarding the posting subject.

Advantageous Effects of Invention

According to an aspect of the present technology, it is possible to easily ascertain trends in posts regarding a posting subject.

BRIEF DESCRIPTION OF DRAWINGS

FIG. 16 is a diagram for explaining a specific example of a content editing process.

FIG. 17 is a block diagram illustrating an exemplary configuration of a computer.

DESCRIPTION OF EMBODIMENTS

Hereinafter, embodiments for carrying out the present technology (hereinafter designated embodiments) will be described. Hereinafter, the description will proceed in the following order.

1. Embodiments
1-1. Exemplary configuration of information processing system
1-2. Processes by information processing apparatus
2. Modifications
<1. Embodiments>
<1-1. Exemplary Configuration of Information Processing System 1>

Figure 1:
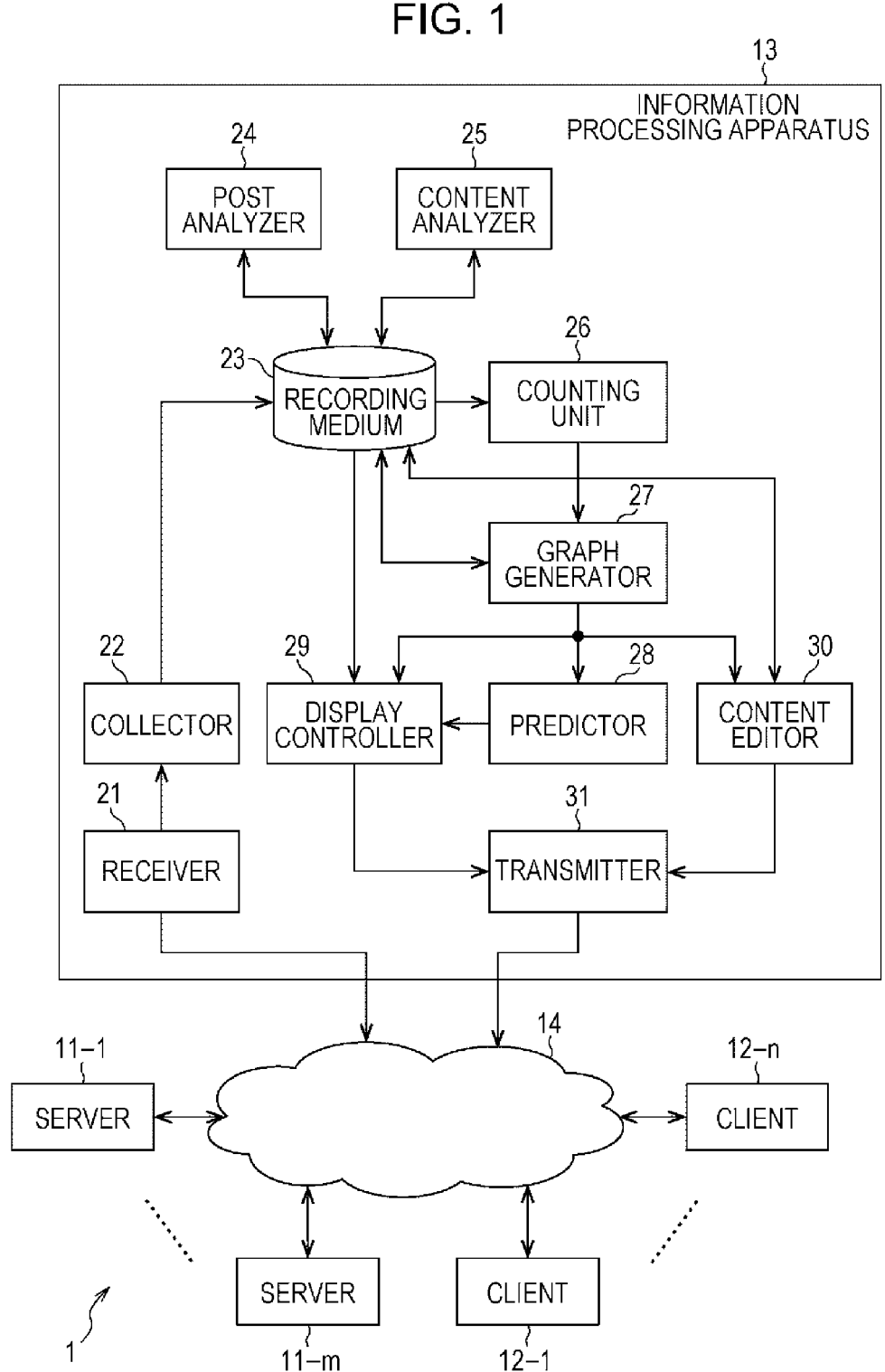
FIG. 1 is a block diagram illustrating an embodiment of an information processing system to which the present technology has been applied.

FIG. 1 is a block diagram illustrating an embodiment of an information processing system 1 to which the present technology has been applied.

The information processing system 1 is configured to include servers 11-1 to 11-$m$, clients 12-1 to 12-$n$, and an information processing apparatus 13. The servers 11-1 to 11-$m$, the clients 12-1 to 12-$n$, and the information processing apparatus 13 are connected to each other via a network 14 comprising the Internet, for example.

Note that hereinafter, the servers 11-1 to 11-$m$ will be simply designated the servers 11 in cases where it is not necessary to individually distinguish them. Also, hereinafter, the clients 12-1 to 12-$m$ will be simply designated the clients 12 in cases where it is not necessary to individually distinguish them.

Some of the servers 11 provide services that deliver various content to the information processing system 1, for example. Content delivered by the servers 11 includes content that proceeds over time, such as video or music data, for example.

Additionally, some of the servers 11 provide posting services that collect posts regarding various posting subjects from the clients 12, and present the clients 12 with images for displaying collected posts, for example.

Herein, the posting services provided by the servers 11 are assumed to be blogs, microblogs (such as TWITTER (trademark), for example), chat services, message boards, social networking services (SNS), and video-sharing services, for example.

The clients 12 comprise devices able to communicate with the servers 11 and the information processing apparatus 13 via the network 14, such as personal computers, personal digital assistants, mobile phones, television receivers, and videogame consoles, for example.

A user is able to use a client 12 to utilize content delivered by the servers 11, utilize posting services provided by the servers 11, and make posts regarding given posting subjects.

Herein, the posting subjects of posting services are assumed to be various content that proceeds over time, such as video content (such as TV programs and movies, for example) and music content (such as radio programs and music, for example), as well as various events that proceed over time, such as concerts, lectures, sports matches, and product announcements, for example.

Furthermore, content taken to be a posting subject is not limited to that which is delivered to from the servers 11 to the clients 12. For example, it is possible for a user to view a TV program received from a different apparatus than a server 11 with a different apparatus than a client 12, and while doing so use a client 12 to make posts regarding that TV program.

Also, the types of posts that can be posted by posting services are not limited to those given, and are assumed to be messages consisting of text data (hereinafter also designated posted messages), still images, videos, and audio data, for example.

The information processing apparatus 13 provides a post analysis service to the clients 12. While the information processing apparatus is shown as one device, it should be understood that some of the functionality in the information processing apparatus 13 may be performed remotely, such as through on a cloud server. In particular the post analyzer 24 and the content analyzer 25 may be performed using cloud servers. Although later discussed in detail with reference to drawings such as FIG. 2, the post analysis service is a service that collects posts regarding a given posting subject, analyzes and counts the collected posts, and presents the results to the clients 12.

The information processing apparatus 13 also provides a content editing service to the clients 12. Although later discussed in detail with reference to drawings such as FIG. 15, the content editing service is a service that edits content such as video content on the basis of post analysis and counting results, and presents the edited content to the clients 12.

An exemplary configuration of the information processing apparatus 13 will now be described.

The information processing apparatus 13 is configured to include a receiver 21, a collector 22, a recording medium 23, a post analyzer 24, a content analyzer 25, a counting unit 26, a graph generator 27, a predictor 28, a display controller 29, a content editor 30, and a transmitter 31.

The receiver 21 communicates with the servers 11 and the clients 12 via the network 14, and receives various data transmitted from the servers 11 and the clients 12.

Posts that have been posted from the clients 12 to the servers 11 are collected by the collector 22 from the servers 11 via the network 14 and the receiver 21. The collector 22 records collected posts to the recording medium 23.

Additionally, the collector 22 receives content delivered by the servers 11 as necessary via the network 14 and the receiver 21. The collector 22 records received content to the recording medium 23.

The post analyzer 24 analyzes posts recorded to the recording medium 23, and classifies them into a plurality of classes. The post analyzer 24 records the classified results to the recording medium 23 in association with respective posts.

The content analyzer 25 analyzes features in content recorded to the recording medium 23. The content analyzer 25 records the analysis results to the recording medium 23.

The counting unit 26 counts the number of posts collected by the collector 22 and recorded to the recording medium 23 for each class classified by the post analyzer 24. The counting unit 26 supplies the counting results to the graph generator 27.

On the basis of counting results from the counting unit 26, the graph generator 27 generates a graph illustrating time-wise trends in post counts for each class (hereinafter designated a post count trend graph). The graph generator 27 supplies data indicating the generated post count trend graph to the predictor 28, the display controller 29, and the content editor 30. The graph generator 27 also records data indicating the generated post count trend graph to the recording medium 23 as necessary.

In addition, on the basis of content feature analysis results recorded to the recording medium 23, the graph generator 27 generates a graph illustrating time-wise trends in content features (hereinafter designated a feature trend graph). The graph generator 27 supplies data indicating the generated feature trend graph to the display controller 29.

On the basis of past post count trend graph data recorded to the recording medium 23, the predictor 28 predicts future trends in the post count trend graph generated by the graph generator 27. The predictor 28 supplies the prediction results to the display controller 29.

On the basis of posts and content stored in the recording medium 23, data acquired from the graph generator 27, and prediction results acquired from the predictor 28, the display controller 29 generates display control data for displaying a post analysis screen that includes a post count trend graph. The display controller 29 controls the display of post analysis screens in the clients 12 by transmitting generated display control data via the transmitter 31 and the network 14 to clients 12 which utilize the post analysis service.

The content editor 30 edits content recorded to the recording medium 23 on the basis of a post count trend graph for that content. The content editor 30 transmits edited content via the transmitter 31 and the network 14 to a recipient client 12.

The transmitter 31 communicates with the servers 11 and the clients 12 via the network 14, and transmits various data to the servers 11 and the clients 12.

<1-2. Processes by Information Processing Apparatus 13>

Next, processes executed by the information processing apparatus 13 will be described with reference to FIGS. 2 to 16.

(First Embodiment of Post Analysis Service-Providing Process)

First, a first embodiment of a post analysis service-providing process executed by the information processing apparatus 13 will be described with reference to the flowchart in FIG. 2.

In step S1, the collector 22 determines whether or not a condition for collecting posts is set. The process proceeds to step S2 in the case where it is determined that a condition for collecting posts is not set.

In step S2, the collector 22 sets a condition for collecting posts. Specifically, the service provider of the post analysis service may input a condition for collecting posts into the information processing apparatus 13 via an input unit not illustrated, for example. The collector 22 acquires an input condition and sets it as the condition when collecting subsequent posts.

At this point, a keyword or tag related to a posting subject, the URL (Uniform Resource Locator) of a posting service from which to collect posts, the user name of a poster, a fingerprint given as unique authentication information, or an analysis period may be set as the condition for collecting posts, for example.

Herein, a keyword or tag related to a posting subject and set as a collection condition is assumed to be, for example, the name of content or an event given as the posting subject, the name of a character, or the name of a service or business delivering content (such as the name of a television station, for example).

After that, the process proceeds to step S3.

In contrast, the operation in step S2 is skipped and the process proceeds to step S3 in the case where it is determined in step S1 that a condition for collecting posts is set.

In step S3, the collector 22 collects posts. In other words, the collector 22 uses various search technology and crawling technology to collect posts satisfying the set collection condition from the servers 11. The collector 22 records collected posts, together with the post time, to the recording medium 23.

In step S4, the post analyzer 24 analyzes collected posts and classifies them into a plurality of classes.

For example, in the case where the type of post is limited to text data (posted messages), the post analyzer 24 may classify posts into the two classes of positive posts and negative posts.

Herein, positive posts refer to posts that, for example, include positive expressions (such as opinions, thoughts, and feelings, for example), while negative posts refer to posts that, for example, include negative expressions.

Herein, an arbitrary technique may be implemented as the technique for classifying collected posts into the two classes of positive posts and negative posts. For example, it is possible to utilize the technique disclosed in Japanese Unexamined Patent Application Publication No. 2010-272004 (hereinafter designated PTL 2) or in N. Kobayashi et al., "Opinion Mining from Web documents: Extraction and Structurization", Journal of the Japanese Society for Artificial Intelligence, Vol. 22, No. 2, March 2007, pp. 227-238 (hereinafter designated NPL 1), the contents of each of which being incorporated herein by reference.

Specifically, a classifier for classifying subjective posts and objective posts is generated in advance with a learning process using boosting that takes the Bayesian network disclosed in PTL 2 as weak hypotheses, and the classifier is built into the post analyzer 24.

Herein, subjective posts refer to posts that, for example, include subjective expressions (such as thoughts, opinions, and feelings, for example), and correspond to the opinion sentence in PTL 2. Meanwhile, objective posts refer to posts that, for example, include only objective expressions without including subjective expressions, and correspond to the non-opinion sentence in PTL 2.

The post analyzer 24 extracts features from the collected posts, and on the basis of the extracted features, classifies the posts into the two classes of subjective posts and objective posts using the classifier. Additionally, the post analyzer 24 classifies subjective posts into the two classes of positive posts and negative posts using the technique disclosed in NPL 1.

Then, the post analyzer 24 records the classified results to the recording medium 23 in association with respective posts.

Meanwhile, in this case, it may also be configured such that posts classified as objective posts are exempted from the counting operation in step S5 discussed later, or alternatively, are also classified into positive posts and negative posts similarly to subjective posts.

Furthermore, it may be configured such that a numerical value representing the positivity or negativity of each post is computed, with posts being classified into the two classes of positive posts and negative posts on the basis of the numerical values.

However, in the following description, an example will be described in which the type of post is limited to text data (posted messages), and collected posts are classified into positive posts and negative posts.

In step S5, the counting unit 26 counts the number of posts in each class. For example, the counting unit 26 may count the number of positive posts and the number of negative posts per a given unit of time (per 1 minute, for example), on the basis of the post time of each post. The counting unit 26 supplies the counting results to the graph generator 27.

In step S6, the graph generator 27 generates a graph illustrating time-wise trends in the post count for each class. For example, on the basis of counting results from the counting unit 26, the graph generator 27 may generate a post count trend graph illustrating time-wise trends in the number of positive posts (hereinafter simply designated the positive post count). Similarly, on the basis of counting results from the counting unit 26, the graph generator 27 may generate a post count trend graph illustrating time-wise trends in the number of negative posts (hereinafter simply designated the negative post count). The graph generator 27 supplies data indicating the generated graph to the display controller 29.

In step S7, the display controller 29 generates display control data. In other words, on the basis of data acquired from the graph generator 27 and posts stored in the recording medium 23, the display controller 29 generates display control data for causing clients 12 to display a post analysis screen that includes a post count trend graph of the positive and negative post counts. The display control data may include programs and data required to display a post analysis screen, for example.

In step S8, the display controller 29 transmits the generated display control data via the transmitter 31 and the network 14 to clients 12 which utilize the post analysis service.

Clients 12 receiving the display data then use the display control data to display a post analysis screen.

Herein, a specific example of a post analysis screen will be discussed later.

In step S9, the collector 22 determines whether or not a post analysis period has ended. The process returns to step S3 in the case where it is determined that the post analysis period has not ended.

After that, the operations in step S3 to S9 are repeatedly executed at, for example, a given interval (such as every 1 minute, for example), until it is determined in step S9 that the post analysis period has ended. Thus, while a posting subject proceeds, posts are collected at a given interval, a post count for each class is calculated, and the display of post count trend graphs on the clients 12 is updated.

In contrast, the post analysis service-providing process ends in the case where it is determined in step S9 that the post analysis period has ended.

(Specific Example of Post Analysis Screen)

Figure 3:
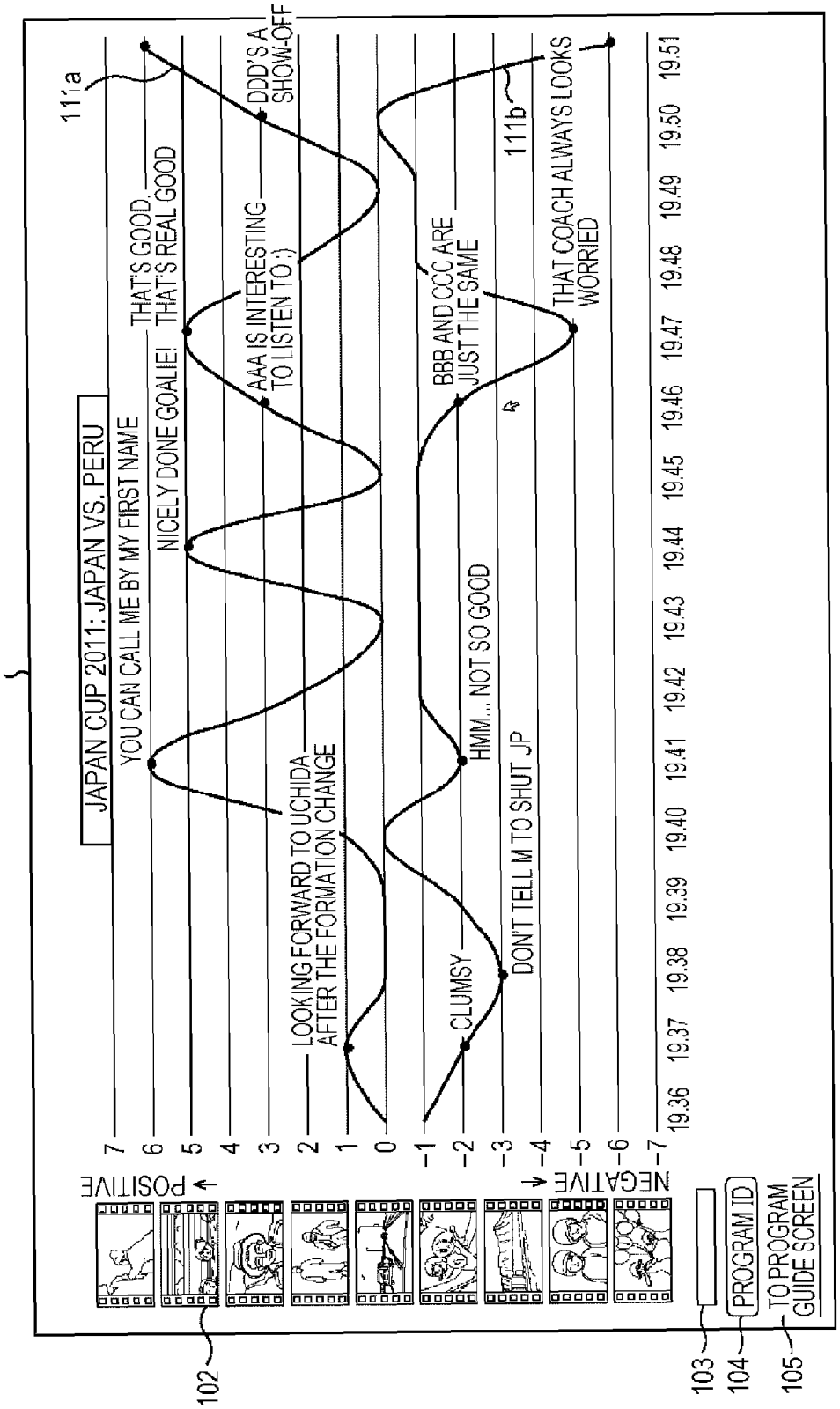
FIG. 3 is a diagram illustrating an exemplary post analysis screen.

FIG. 3 illustrates an exemplary example of a post analysis screen. Herein, FIG. 3 illustrates an example of a post analysis screen for a televised soccer match.

Displayed on the post analysis screen are a post count trend graph 101, a channel selection menu 102, an input field 103, a button 104, and hypertext 105.

The horizontal axis of the post count trend graph 101 indicates time, while the vertical axis indicates the post count per unit time (1 minute, for example). Also, the vertical axis is split into two parts by a central axis parallel to the time axis, with the upper part illustrating the positive post count, and the lower part illustrating the negative post count. Also, on the positive post count axis, the upward direction is the positive direction, with the post count increasing as the graph moves up. Conversely, on the negative post count axis, the downward direction is the positive direction, with the post count increasing as the graph moves down. In other words, the coordinate system indicating time-wise trends in the positive post count (hereinafter designated the positive coordinate system) and the coordinate system indicating time-wise trends in the negative post count (hereinafter designated the negative coordinate system) are disposed with horizontal symmetry about the central axis parallel to the time axis.

The graph $111a$ expressed in the positive coordinate system illustrates time-wise trends in the positive post count per unit time (per 1 minute, for example). Meanwhile, the graph $111b$ expressed in the negative coordinate system illustrates time-wise trends in the negative post count per a given unit of time (per 1 minute, for example). Consequently, peaks in the graph 111a rise with increasing positive posts, while valleys in the graph 111b deepen with increasing negative posts.

Furthermore, both the graph 111a and the graph 111b are illustrated with smooth curves by using spline interpolation to join the coordinates of the post counts at each time value.

Also, some of the positive posts are displayed together with the graph 111a along the time axis as additional information. More specifically, near the peaks in the graph 111a, or in other words, near positions where the positive post count reaches a peak, one of the positive posts posted during a time period that includes the time corresponding to the respective peak is displayed overlaid with the graph 111a. Additionally, near positions where the graph 111a rises greatly (positions where the rate of climb or the magnitude of climb is equal to or greater than a threshold value, for example), or in other words, near positions where the positive post count is increasing greatly, one of the positive posts posted during a time period that includes the time corresponding to the respective position is displayed overlaid with the graph 111a.

Similarly, some of the negative posts are displayed together with the graph 111b along the time axis as additional information. More specifically, near the bottoms (negative peaks) in the graph 111b, or in other words, near positions where the negative post count reaches a peak, one of the negative posts posted during a time period that includes the time corresponding to the respective bottom is displayed overlaid with the graph 111b. Additionally, near positions where the graph 111b falls greatly (positions where the rate of fall or the magnitude of fall is equal to or greater than a threshold value, for example), or in other words, near positions where the negative post count is increasing greatly, one of the negative posts posted during a time period that includes the time corresponding to the respective position is displayed overlaid with the graph 111b.

In addition, by causing the graphs 111a and 111b as well as posts being displayed as additional information to scroll to the left as time elapses, the post count trend graphs and posts are displayed linked along the time axis.

Furthermore, it may also be configured such that the posts to display as additional information are selected randomly from among a plurality of posts posted during the same time period, or it may be configured such that the posts with the highest positivity or negativity are selected, for example. Alternatively, it may be configured such that a plurality of posts posed during the same time period are displayed by switching among them at a given time interval. As another alternative, it may be configured such that posts including content or expressions that match a user's preferences are selected and displayed according to the preferences of users of the clients 12.

Also, it may be configured such that phrases containing subjective expressions in respective posts classified as positive or negative are emphasized by changing the color or font, for example. Furthermore, it may be configured such that strings indicating the subjects of such subjective expressions (such as topics, for example) are also emphasized, for example. Also, it may be configured such that information indicating posters (such as user icons, for example) are displayed together with posts.

In addition, information such as the title of the televised soccer match given to be the posting subject is displayed centered at the top of the post count trend graph 101.

A user is able to refer to this post count trend graph 101 and easily ascertain trends in posts from users regarding a posting subject. More specifically, a user is able to easily ascertain trends in the positive or negative reactions of users with respect to a posting subject.

A channel selection menu 102 is displayed to the left of the post count trend graph 101. Displayed in the channel selection menu 102 are vertically arranged thumbnail images of programs currently being broadcast on selectable channels (stations). By selecting one of the thumbnail images in the channel selection menu 102, a user is able to select the program currently being broadcast on the selected channel (station). Additionally, a post count trend graph 101 corresponding to the selected program is displayed on the post analysis screen.

Below the channel selection menu 102 are displayed an input field 103, a button 104, and hypertext 105, arranged vertically.

By inputting the program ID of a desired program into the input field 103 and pressing the button 104, a user is able to cause a post count trend graph 101 for the program corresponding to the input program ID to be displayed.

Also, by clicking the hypertext 105 using a pointing device or other means, a user is able to cause a program guide for TV programs to be displayed.

Figure 4:
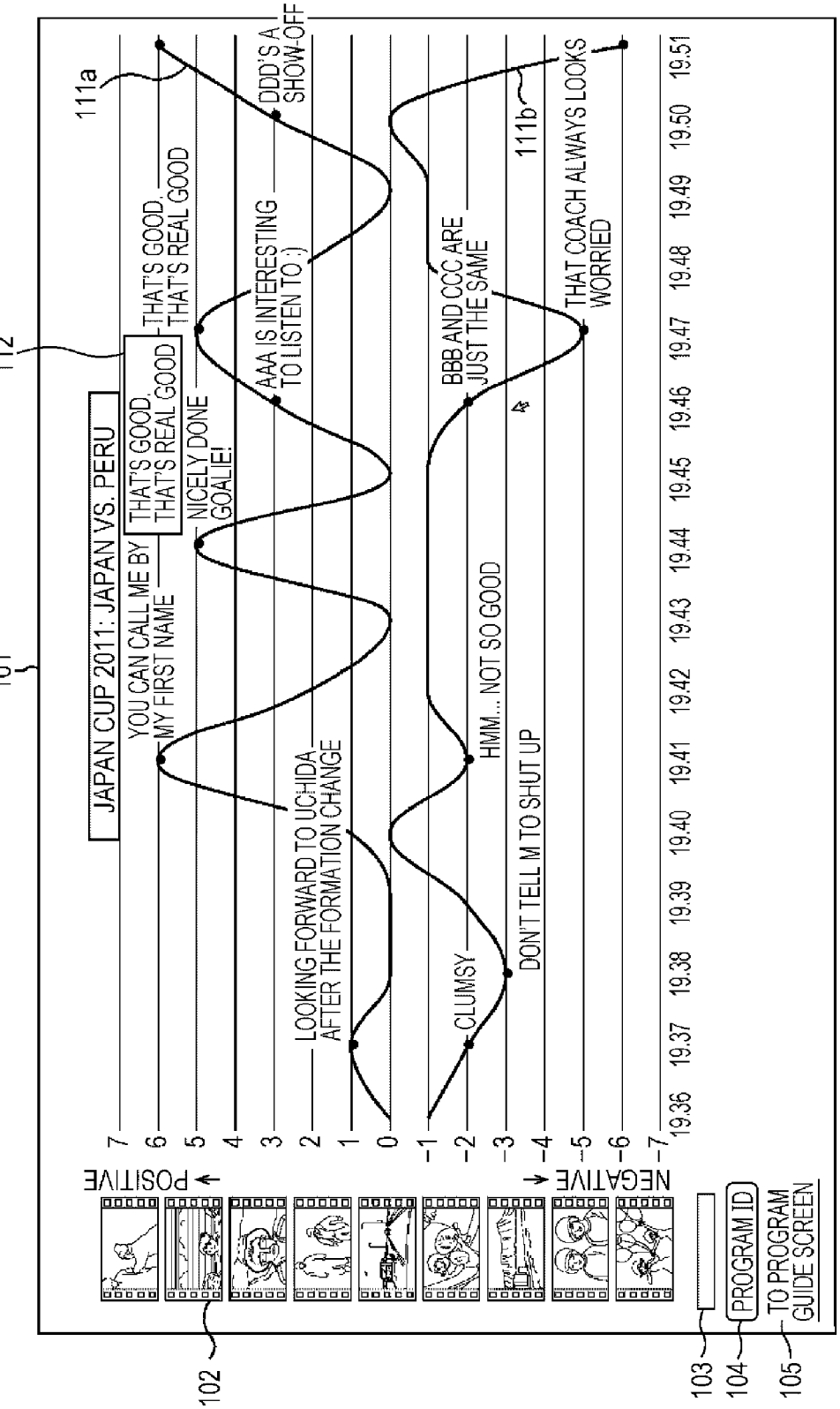
FIG. 4 is a diagram illustrating an example in which a post has been enlarged on a post analysis screen.

Furthermore, by placing a cursor, pointer, or other means over part of a peak formed by the graph 111a, a user is able to enlarge and display one of the positive posts posted during the time period of the overlaid position (hereinafter designated the specification position), as illustrated in the box 112 in FIG. 4. Also, by moving the specification position in the time axis direction, posts posted during time periods corresponding to the specification positions will be enlarged and displayed. In other words, the enlarged posts are switched along the time axis.

Meanwhile, it is similarly possible to enlarge and display one of the negative posts posted during the time period of a specification position in the case of placing a cursor, pointer, or other means over part of a peak formed by the graph 111b.

Also, it may be configured such that moving the specification position in the post count axis direction, for example, switches the post to enlarge and display from among posts posted during the same time period, for example.

(Modifications of Additional Information)

However, it may also be configured such that other information regarding a posting subject besides posts is displayed as additional information together with a post count trend graph.

Figure 5:
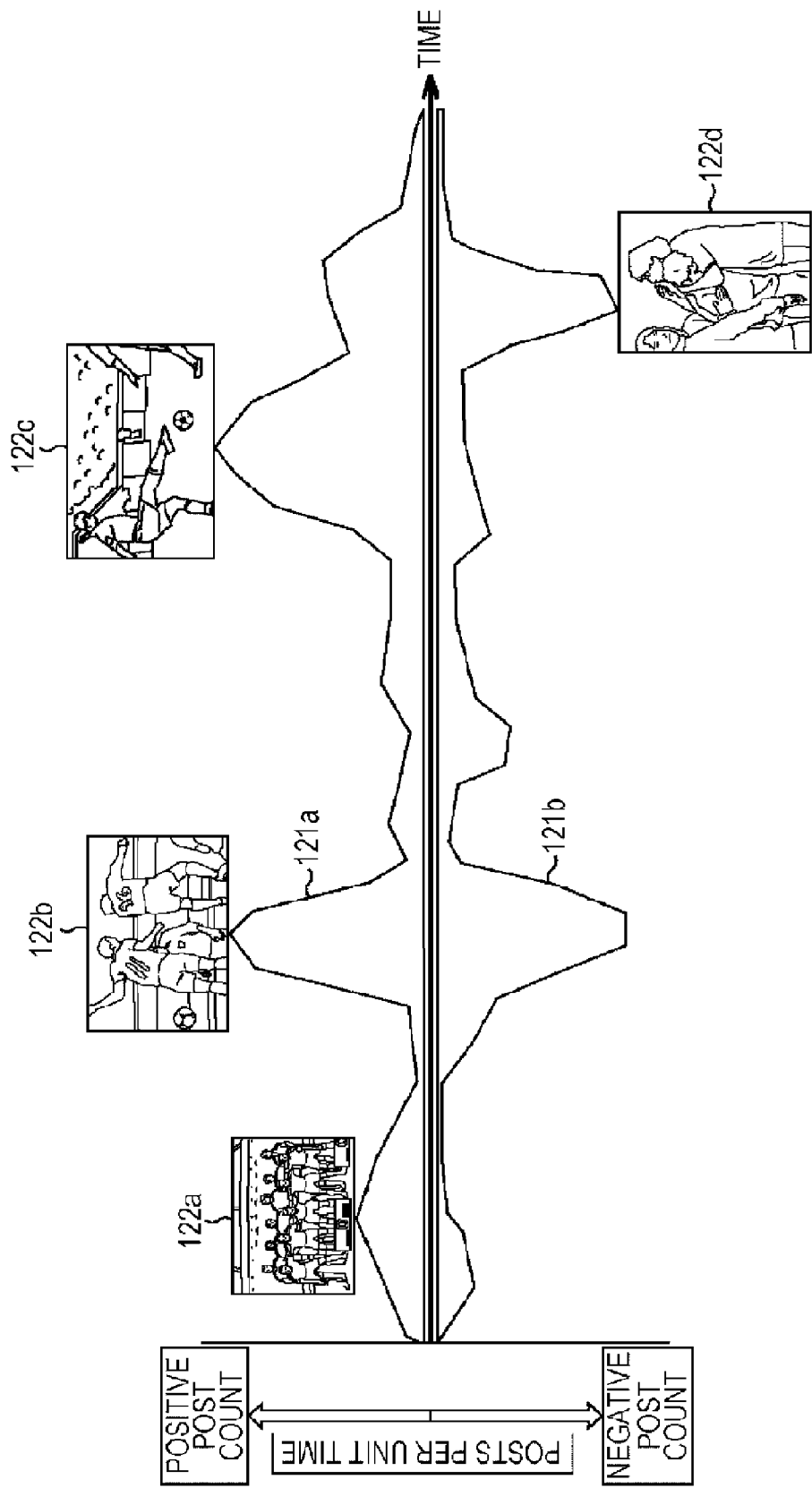
FIG. 5 is a diagram illustrating a modification in which additional information is displayed together with a post count trend graph.

For example, in the case where the posting subject is video content, it may be configured such that scene images at respective times are displayed along the time axis together with a post count trend graph. Specifically, it may be configured such that scene images 122a to 122d are displayed as additional information at times corresponding to respective peaks near (a portion of) the peaks in a graph 121a illustrating positive post count trends and a graph 121b illustrating negative post count trends, as illustrated in FIG. 5, for example.

In addition, by causing the graphs 111a and 111b as well as scene images being displayed as additional information to scroll to the left as time elapses, the post count trend graphs and content are displayed linked along the time axis.

However, it may also be configured such that scene images are overlaid and displayed not only near peaks, but also near positions where the post count is changing greatly (for example, positions where the rate of change or the magnitude of change is equal to or greater than a given threshold value), with the scene images being from times corresponding to those positions, for example.

Also, in the case where the posting subject is a concert or other live event, it may be configured such that images or scene images from videos shot by event attendees are displayed as additional information.

Furthermore, it may be configured such that other information besides images is displayed as additional information, such as information indicating the state of the posting subject at respective times or a synopsis.

In addition, it may be configured such that posts and information regarding the posting subject are both displayed as additional information.

However, it may also be configured such that, rather than displaying additional information overlaid with a post count trend graph as in FIGS. 3 to 5, the additional information is arranged in a time series displayed above or below the post count trend graph, and scrolls as time elapses, for example.

(Modifications of Posting Subject Trend Graph Display Format)

In the above description, an example was given in which a posting subject trend graph is displayed as a line graph or an area graph, but it may also be configured such that a posting subject trend graph is displayed as another type of graph (such as a bar graph, for example).

Also, it may be configured such that time-wise trends in post counts are displayed by displaying user icons representing posters of posts posted during the same time period stacked like a bar graph, for example. In this case, it may also be configured such that by specifying a user icon, a post corresponding to the specified icon is enlarged and displayed similarly to the example in FIG. 4, for example.

Furthermore, it may be configured such that the colors and types of lines, fill colors, or other ornamental elements are individually varied among the graphs, for example.

In addition, although an example in which a post count trend graph scrolls from right to left was given in the above description, it may also be configured to scroll from left to right, for example. Also, it may be configured such that the time axis is set in the vertical direction, with the graph scrolling from top to bottom or from bottom to top.

Figure 6:
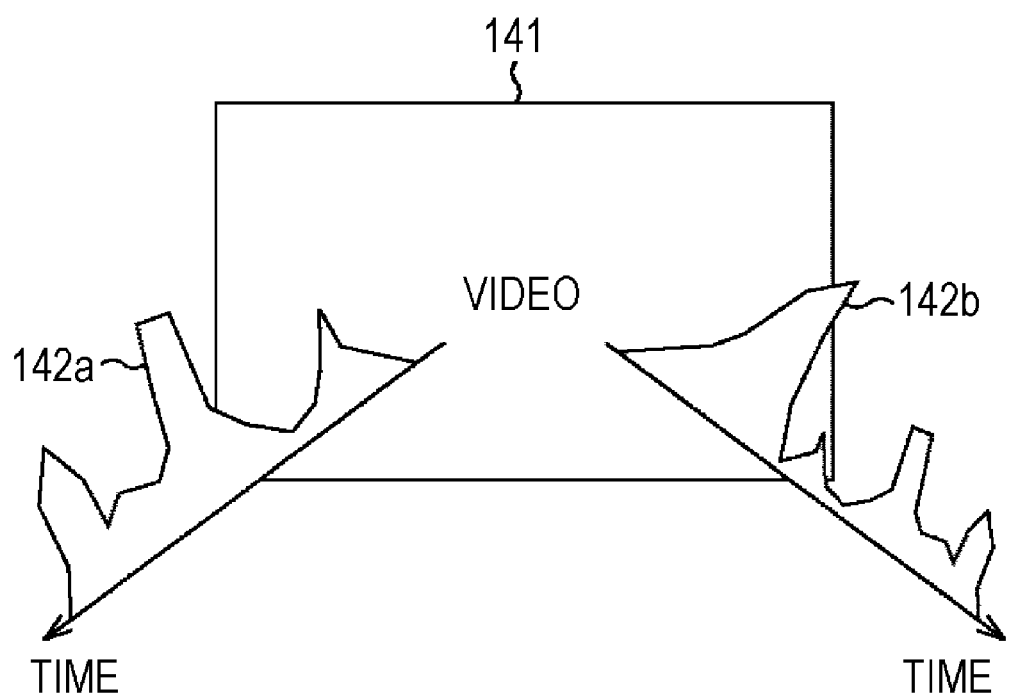
FIG. 6 is a diagram illustrating a first modification of a display format for a post count trend graph.

Furthermore, in the case where a client 12 is able to display 3D images, it may be configured such that the time axis is set in the depth direction, with the graph scrolling from front to back or from back to front. In this case, it may be configured such that a graph 142a illustrating positive post counts and a graph 142b illustrating negative post counts are split left and right and displayed together with a picture of the posting subject, as illustrated in FIG. 6, for example.

In addition, it may be configured such that the entire post count trend graph is always displayed without scrolling the post count trend graph by, for example, increasing the units of the time axis scale as time elapses (such as by changing 1 minute per scale tick to 10 minutes, for example).

Furthermore, it may be configured such that time-wise trends in the post counts of posts satisfying a given condition in each class are displayed together with the overall time-wise trends in the post counts for each class, for example.

Figure 7:
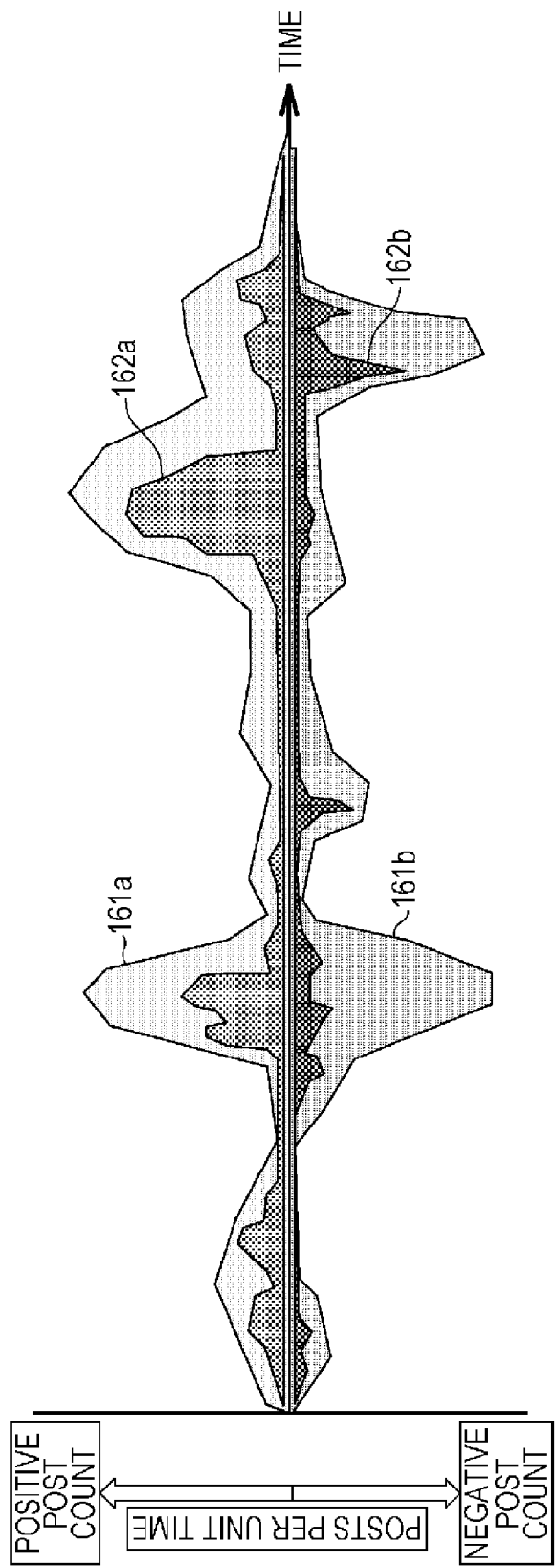
FIG. 7 is a diagram illustrating a second modification of a display format for a post count trend graph.

FIG. 7 illustrates an example of the case of displaying time-wise trends in the post counts of posts that include a given keyword, together with time-wise trends in the overall post counts of collected posts. Specifically, the graph 161a illustrates overall time-wise trends in the positive post count, while the graph 161b illustrates overall time-wise trends in the negative post count. Meanwhile, the graph 162a illustrates time-wise trends in the number of posts that include a given keyword from among the positive posts, while the graph 162b illustrates time-wise trends in the number of posts that include a given keyword from among the negative posts.

For example, by configuring it such that a keyword can be set from a client 12, it becomes possible for a user to ascertain overall trends in the positive and negative post counts, as well as trends in the post counts of positive and negative posts that include a desired keyword. In addition, it becomes possible for a user to ascertain the proportional extent to which the post count of posts that include a desired keyword dominates the overall post count at respective times.

However, the condition filtering the post count to display is not limited to being a keyword, and it is also possible to configure it such that filtering is conducted by taking post features (such as character count) or poster attributes (such as sex or age) as conditions, for example.

(Modifications of Basis by which to Classify Posts)

In addition, although an example in which collected posts are classified into positive posts and negative posts was given in the above description, it may also be configured such that posts are classified into a plurality of classes and a graph illustrating trends in the post count for each class is displayed according to another basis.

Figure 8:
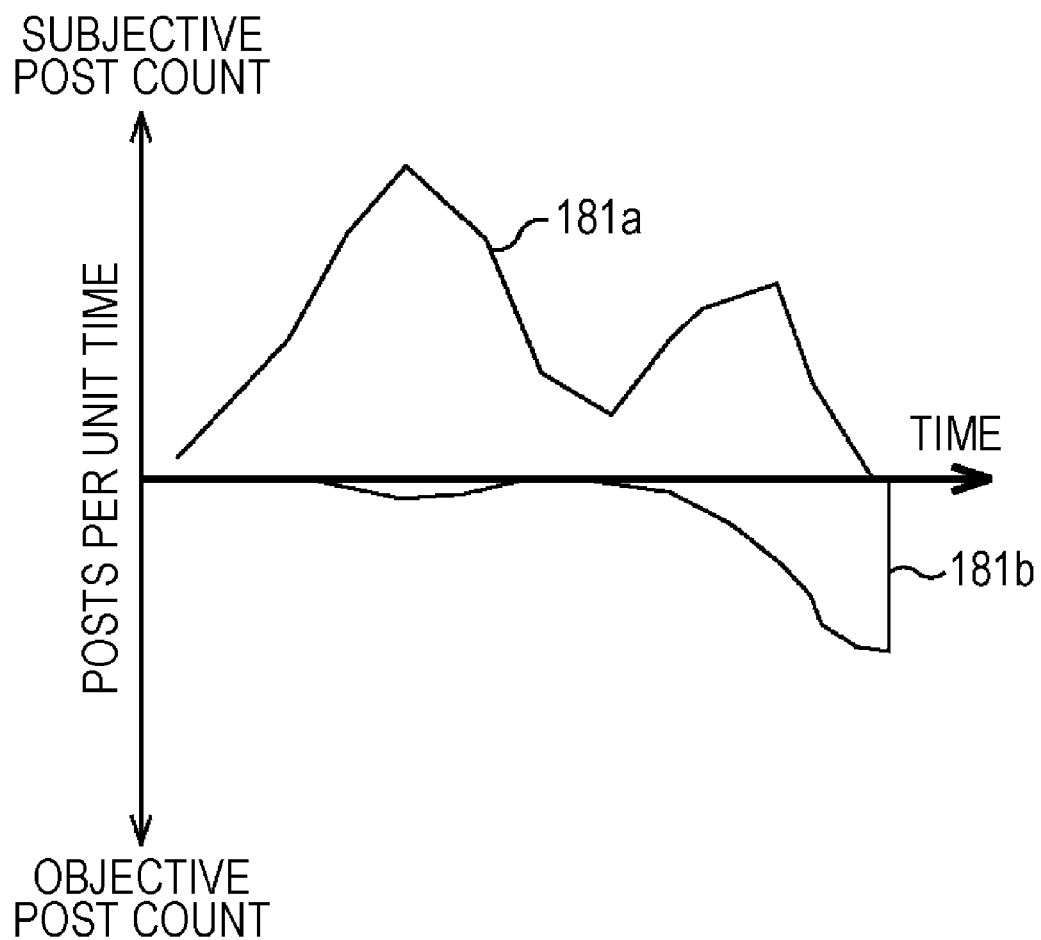
FIG. 8 is a diagram for explaining a modification of a basis by which to classify posts.

For example, it may be configured such that a graph 181a illustrating time-wise trends in the number of subjective posts and a graph 181b illustrating time-wise trends in the number of objective posts are displayed on the basis of the results of classifying collected posts into subjective posts and objective posts, as illustrated in FIG. 8, for example. With this post count trend graph, it is possible to easily ascertain time-wise trends in whether or not it is easy for users to emotionally relate to a posting subject.

Furthermore, it may be configured such that posts are classified into a plurality of classes on the basis of other features of posts besides the above, such as character count or the proportion of Chinese characters.

Additionally, it is possible to configure it such that images and other posts which are not posted messages are likewise classified into a plurality of classes on the basis of their features.

In addition, it may also be configured such that posts are classified on the basis of their popularity, for example. For example, in the case of collecting posts from Twitter (trademark), it may be configured such that posts are classified by analyzing their popularity on the basis of the number of RTs (retweets).

In addition, it may also be configured such that posts are classified on the basis of poster attributes, for example. For example, it may be configured such that a post is classified on the basis of the poster's sex, age, or location.

In addition, it may also be configured such that posts are classified by combining a plurality of bases.

In addition, it may also be configured such that posts are classified into three or more classes. For example, it may be configured such that posts are classified into the three classes of positive posts, negative posts, and neutral posts.

In this case, it is conceivable to configure it such that a plurality of graphs illustrating per-class trends in post counts are displayed by being arranged vertically (in the case where the time axis is in the horizontal direction) or horizontally (in the case where the time axis is in the vertical direction), for example.

(Exemplary Usage Scenario for Post Analysis Service)

A user who views a posting subject (such as a TV program, for example) or attend a posting subject (such as an event, for example) may enjoy utilizing a post analysis service to look at trends in the posts of users as the posting subject proceeds, for example.

In this case, by referring to the post analysis screen illustrated in FIG. 3, for example, a user is able to intuitively ascertain the flow of posts in an organized manner.

Also, by referring to the post analysis screen illustrated in FIG. 5, for example, a user is able to deepen or streamline his or her enjoyment of content.

In addition, a service provider providing a posting subject is able to utilize a post analysis service to ascertain user response to a posting subject and utilize the results, for example.

As an example, a case will be described with reference to FIG. 9, in which an event host uses a video-sharing service to deliver a live feed of an announcement event for a new product X, while utilizing a post analysis service to conduct real-time monitoring of the response to the event and correct the course of the event. Herein, the announcement event is taken to be held from 13:00 to 15:00.

Figure 9:
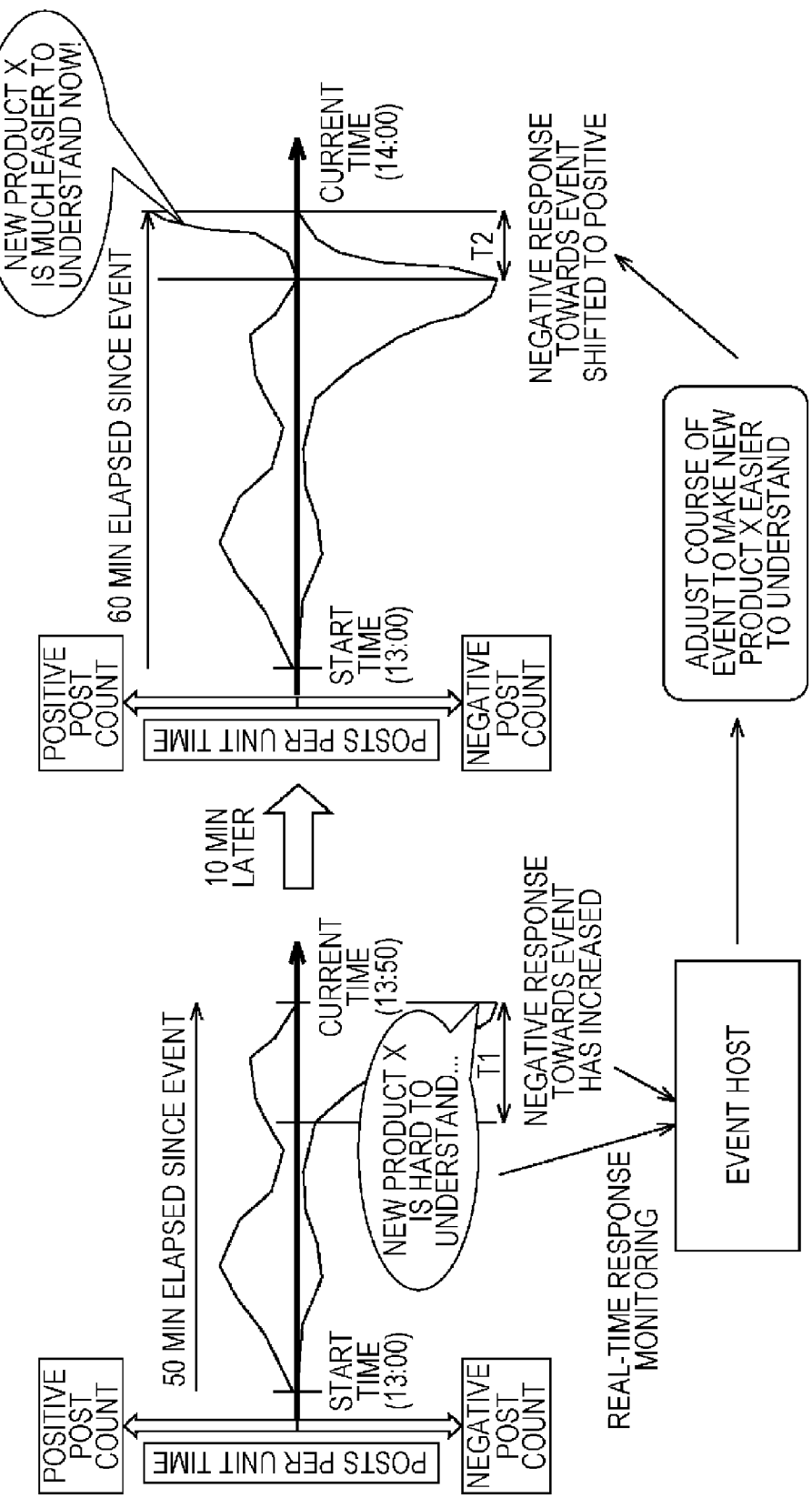
FIG. 9 is a diagram for explaining an exemplary usage scenario for a post analysis service.

The graph on the left side of FIG. 9 illustrates the state of a post count trend graph at the point when 50 minutes have elapsed since the event started. From this graph, the event host can easily recognize that negative response towards the event increased during a period T1 immediately before 13:50.

Thus, the event host can infer the cause of the increase in negative response by referring to the content of the posts, for example. Then, in the case of inferring that the cause is that the explanation of the new product X is difficult to understand, for example, the event host can take measures to correct the course of the event such that the explanation is easier to understand.

The graph on the right side of FIG. 9 illustrates the state of a post count trend graph at the point when 60 minutes have elapsed since the event started, or in other words, the state of a post count trend graph 10 minutes after the graph on the left. From this graph, the event host can easily recognize that negative response towards the event shifted to positive during a period T2 from 13:50 to 14:00. Thus, the event host is able to determine that the event course correction has succeeded.

Conversely, in the case where the negative post count does not decrease, the event host may determine that the event course correction did not go well, and take further measures.

In this way, an event host is able to visually and intuitively recognize trends in the response to an event, and rapidly conduct measures such as event course correction in order to improve response. Furthermore, an event host is able to rapidly recognize the response after a course correction, rapidly determine whether the course correction was good or bad, and take additional measures as necessary.

(Second Embodiment of Post Analysis Service-Providing Process)

Figure 10:
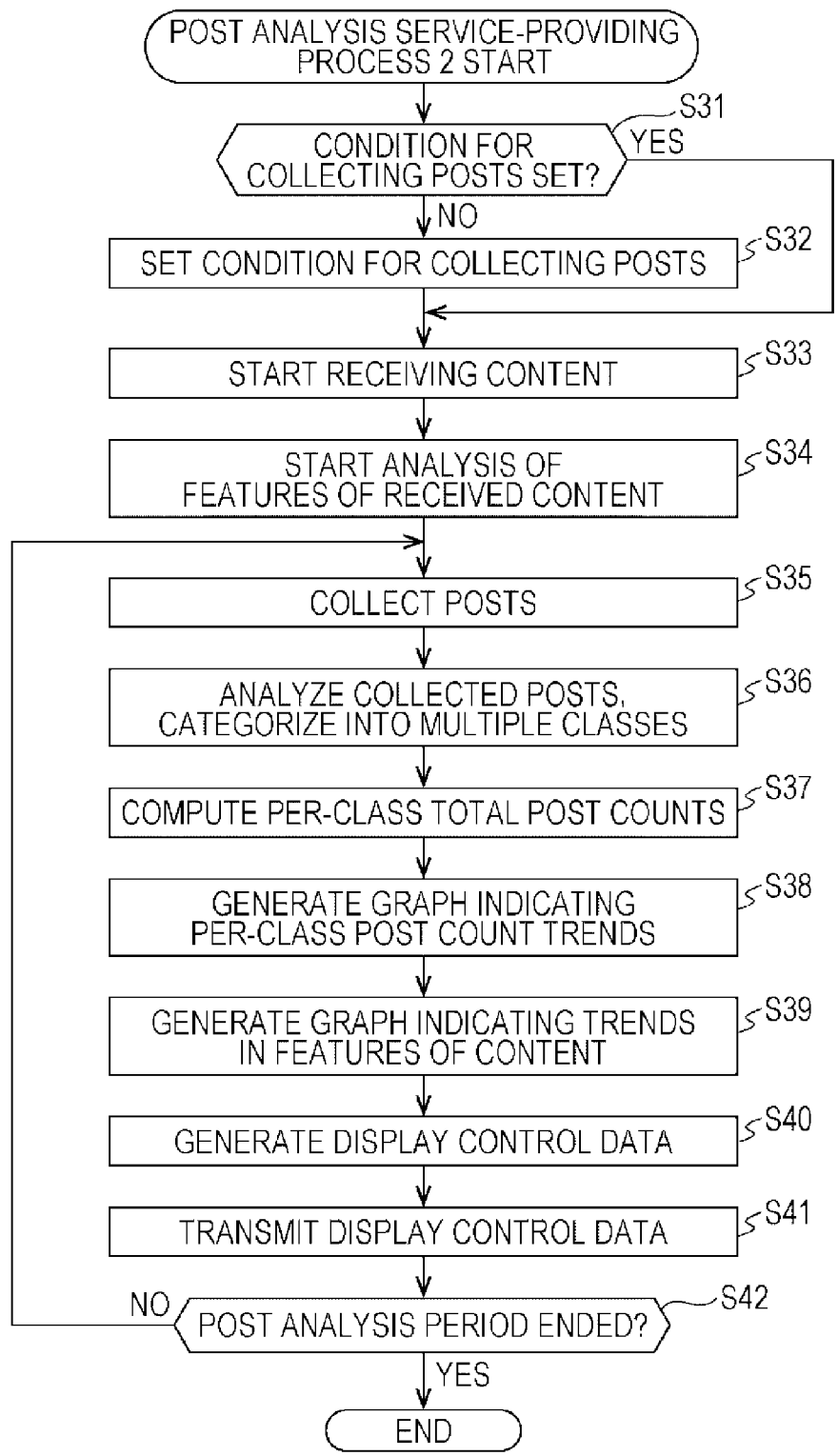
FIG. 10 is a flowchart for explaining a second embodiment of a post analysis service-providing process.

Next, a second embodiment of a post analysis service-providing process will be described with reference to the flowchart in FIG. 10.

Note that with this process, in the case where the posting subject is content, a posting subject trend graph is displayed together with a feature trend graph illustrating trends in features of that content.

Figure 2:
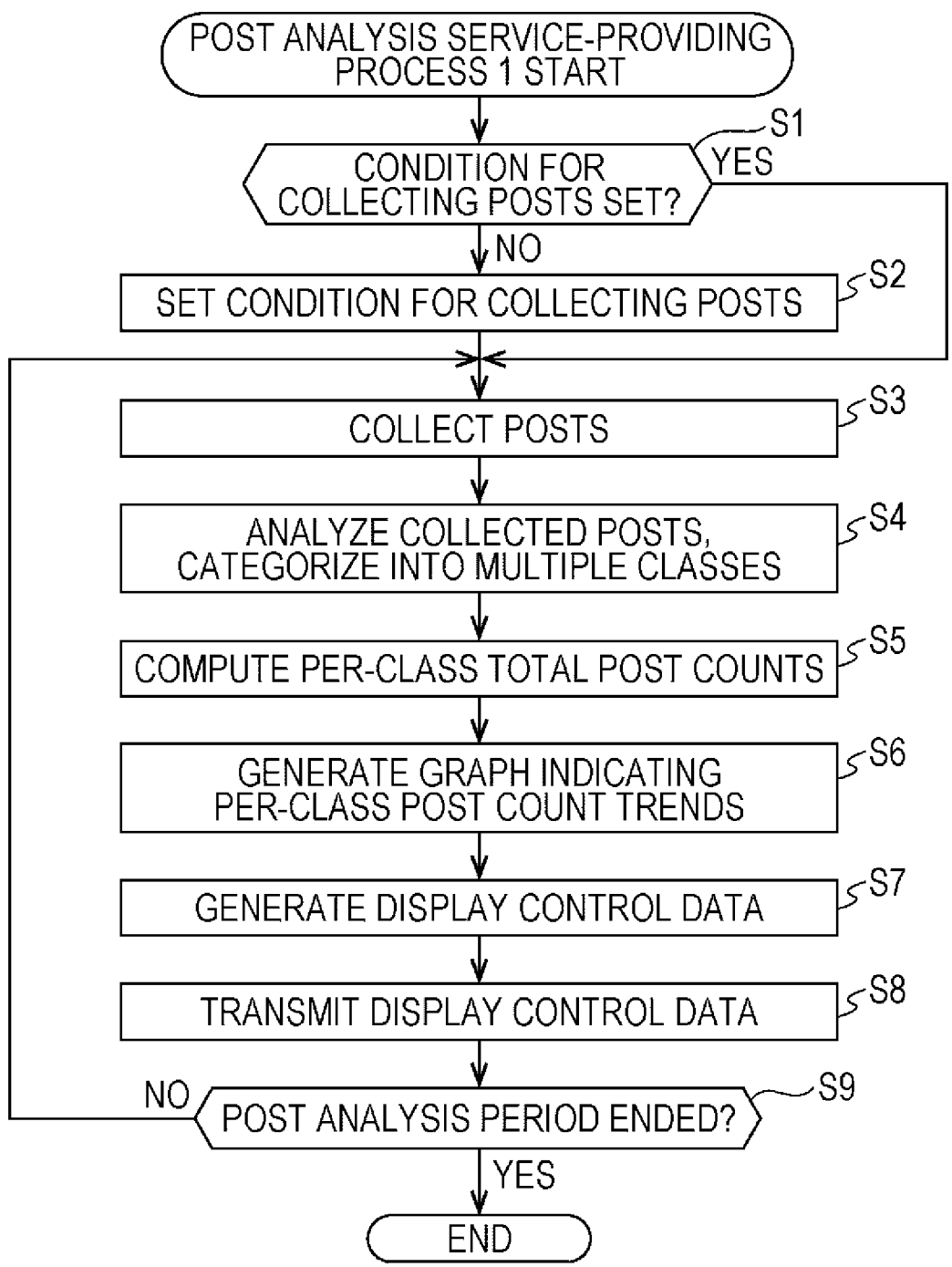
FIG. 2 is a flowchart for explaining a first embodiment of a post analysis service-providing process.

In step S31, it is determined whether or not a condition for collecting posts is set, similarly to the operation in step S1 of FIG. 2. The process proceeds to step S32 in the case where it is determined that a condition for collecting posts is not set.

In step S32, a condition for collecting posts is set, similarly to the operation in step S2 of FIG. 2. After that, the process proceeds to step S33.

In contrast, the operation in step S32 is skipped and the process proceeds to step S33 in the case where it is determined in step S31 that a condition for collecting posts is set.

In step S33, the collector 22 starts receiving, via the receiver 21 and the network 14, content from a server 11 acting as the delivery source of content given as the posting subject. The collector 22 records received content to the recording medium 23.

In step S34, the content analyzer 25 starts analyzing features in the received content. The content analyzer 25 records the analysis results to the recording medium 23.

After that, operations similar to those in step S3 to S6 of FIG. 2 are conducted in steps S35 to S38.

In step S39, the graph generator 27 generates a graph illustrating features of the content. Specifically, on the basis of content feature analysis results recorded to the recording medium 23, the graph generator 27 generates a feature trend graph illustrating time-wise trends in features of the content given as the posting subject. The graph generator 27 supplies data indicating the generated feature trend graph to the display controller 29.

In step S40, the display controller 29 generates display control data. In other words, on the basis of data acquired from the graph generator 27 and posts stored in the recording medium 23, the display controller 29 generates display control data for causing clients 12 to display a post analysis screen that includes a post count trend graph and a feature trend graph. The display control data includes programs and data required to display a post analysis screen.

In step S41, the display controller 29 transmits the generated display control data via the transmitter 31 and the network 14 to clients 12 which utilize the post analysis service.

Clients 12 receiving the display data then use the display control data to display a post analysis screen.

Herein, a specific example of a post analysis screen will be discussed later.

In step S42, the collector 22 determines whether or not a post analysis period has ended. The process returns to step S35 in the case where it is determined that the post analysis period has not ended.

After that, the operations in steps S35 to S42 are repeatedly executed at, for example, a given interval (such as every 1 minute, for example), until it is determined in step S42 that the post analysis period has ended. Thus, while a posting subject proceeds, posts are collected at a given interval, a post count for each class is calculated, and the display of post count trend graphs and feature trend graphs on the clients 12 is updated.

In contrast, the post analysis service-providing process ends in the case where it is determined in step S42 that the post analysis period has ended.

(Specific Example of Graphs Displayed on Post Analysis Screen)

Figure 11:
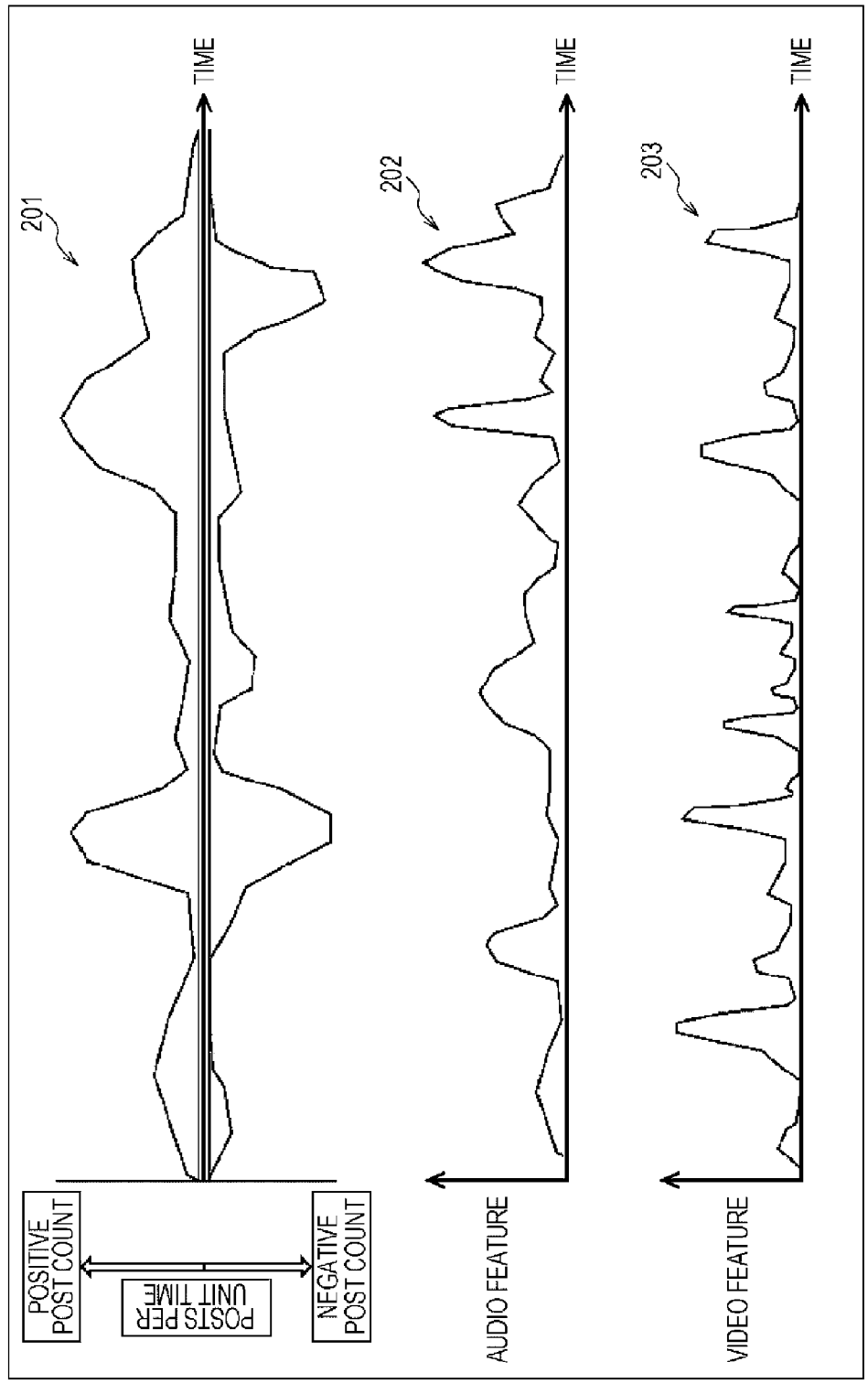
FIG. 11 is a diagram illustrating a first example of graphs displayed on a post analysis screen in a second embodiment of a post analysis service-providing process.

FIG. 11 illustrates a specific example graphs displayed on a post analysis screen in the case where the posting subject is video content.

In this example, displayed below a post count trend graph 201 are an audio feature trend graph 202 illustrating time-wise trends in a feature of the audio signal of content given as the posting subject, and a video feature trend graph 203 illustrating time-wise trends in a feature of the video signal.

The post count trend graph 241, the audio feature trend graph 242, and the video feature trend graph 243 are updated at a given time interval, and synchronously scrolled from right to left as time passes.

Note that the audio feature and video feature are not limited to a specific type, and are taken to be features extractable by performing signal processing on content, for example. For example, the audio feature may be taken to be the amount of cheering in an audio signal, while the video feature may be taken to be the amount of movement by persons in an image.

In addition, the type and number of feature trend graphs to display may be arbitrarily set.

Figure 12:
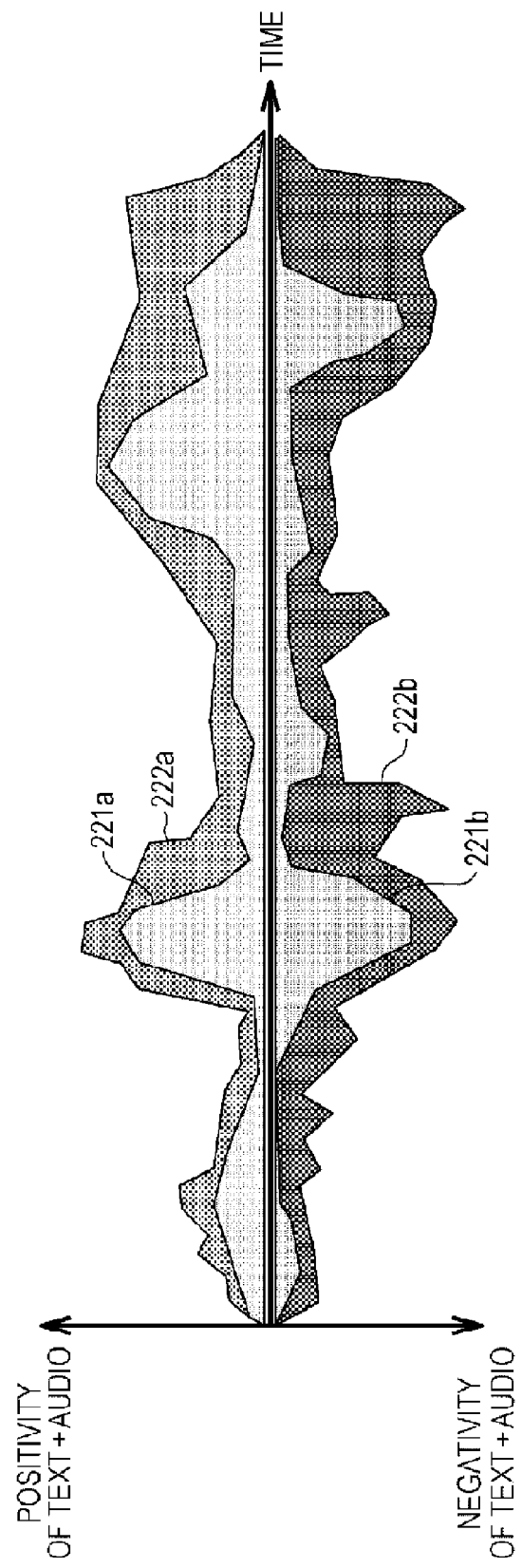
FIG. 12 is a diagram illustrating a second example of graphs displayed on a post analysis screen in a second embodiment of a post analysis service-providing process.

Furthermore, it may be configured such that feature trend graphs are displayed overlaid with a post count trend graph, as illustrated in FIG. 12.

The graph 221a in FIG. 12 illustrates time-wise trends in the positive post count, while the graph 221b illustrates time-wise trends in the negative post count. Meanwhile, the graph 222a illustrates time-wise trends in audio positivity, which indicates the magnitude of positive components extracted from the audio signal of the content. The graph 222b illustrates time-wise trends in audio negativity, which indicates the magnitude of negative components extracted from the audio signal of the content. The graphs 221a and 222b are synchronously scrolled from right to left as time passes.

However, it may also be configured such that a feature trend graph for a video feature instead of an audio feature is displayed overlaid with a post count trend graph, and it may also be configured such that feature trend graphs for both features are displayed overlaid with a post count trend graph.

Figure 13:
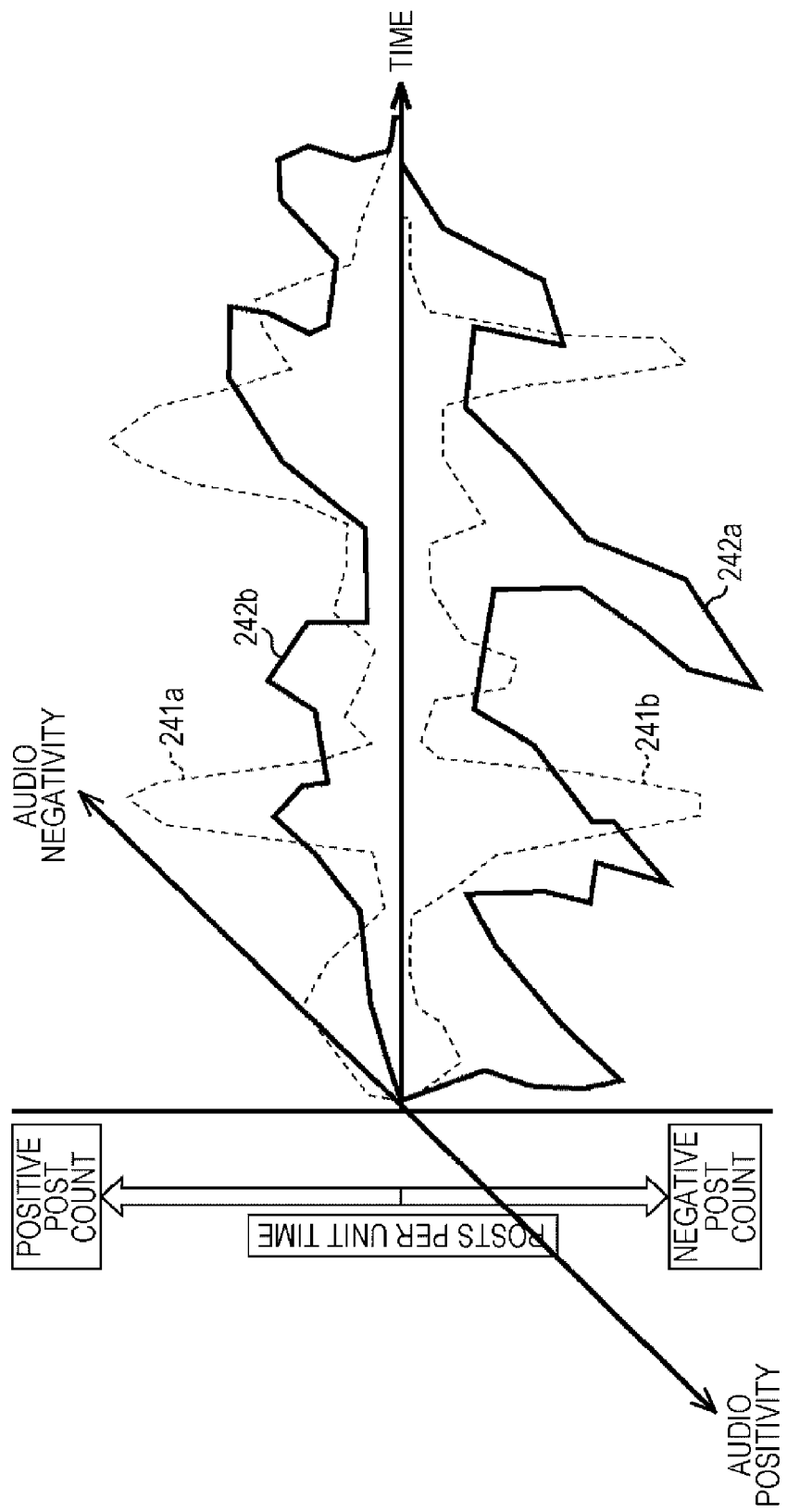
FIG. 13 is a diagram illustrating a third example of graphs displayed on a post analysis screen in a second embodiment of a post analysis service-providing process.

Also, it may be configured such that a post count trend graph and a feature trend graph are displayed by being split in the planar direction and the depth direction of a 3D image, as illustrated in FIG. 13.

In this example, a graph 241a illustrating time-wise trends in the positive post count, a graph 241b illustrating time-wise trends in the negative post count, a graph 242a illustrating time-wise trends in the audio positivity, and a graph 242b illustrating time-wise trends in the audio negativity are displayed along the same single time axis extending in the horizontal direction. Note that in this drawing, the graphs 241a and 241b are indicated by broken lines in order to more easily distinguish the graphs 241a and 241b versus the graphs 242a and 242b.

Also, an axis for the positive post count and the negative post count is set in the vertical direction, with the coordinate system for the graph 241a and the coordinate system for the graph 241b being disposed with horizontal symmetry about the time axis. Additionally, the graph 241a and the graph 241b are displayed in the planar direction of the screen.

Meanwhile, an axis indicating the positive audio level and negative audio level is set in the depth direction, with the coordinate system for the graph 242a and the coordinate system for the graph 242b being disposed symmetrically about the time axis in the front direction and back direction. Additionally, the graph 242a and the graph 242b are displayed in the depth direction of the screen.

Thus, time-wise trends in the different elements of post counts and content features can be three-dimensionally distinguished and perceived.

However, in the example in FIG. 13, it may also be configured such that the time axis is set in the vertical direction, for example.

By displaying a post count trend graph and a feature trend graph along a time axis as above, it is possible to easily ascertain cause-and-effect relationships between time-wise trends in posts and time-wise changes in content features.

Furthermore, the display format of the graphs in FIGS. 11 to 13 may also be applied to the case of respectively classifying posts into a plurality of classes according to two or more different bases, and displaying two or more types of post count trend graphs based on each basis. For example, it is possible for a post count trend graph that takes positive/negative as its basis and a post count trend graph that takes subjective/objective as its basis to be displayed by being split in the planar direction and the depth direction of the screen, similarly to the example illustrated in FIG. 13.

(Exemplary Usage Scenario for Post Analysis Service after Posting Subject has Ended)

Meanwhile, it is also possible to use data stored in the recording medium 23 to utilize a post analysis service even after a posting subject has ended, rather than while the posting subject is proceeding.

For example, besides utilizing a post analysis service with a TV program as the posting subject while that program is being broadcast, a user may be record the TV program and utilize the post analysis service when viewing the TV program after it has finished being broadcast.

Furthermore, in the case where the posting subject is content and the post analysis service is used later, it is also possible to link a post count trend graph to playback of the content.

Figure 14:
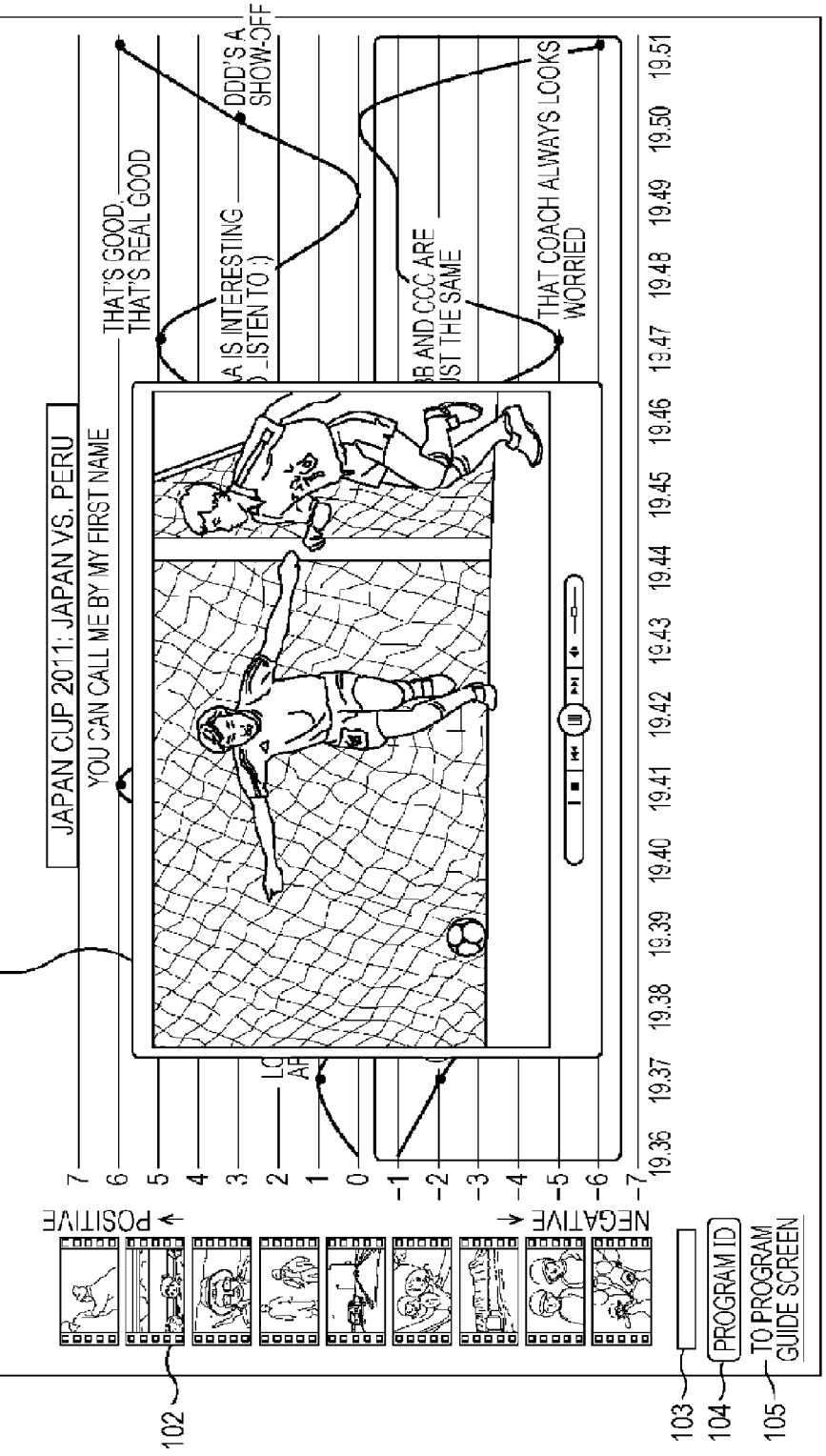
FIG. 14 is a diagram for explaining an operation to play back video content from a post analysis screen.

For example, it is possible to configure it such that clicking part of a peak formed by the graph 111a and the graph 111b in the post analysis screen in FIG. 3 causes the corresponding content to be played back from the time of the clicked position, with a playback screen being displayed in a window 241, as illustrated in FIG. 14. Furthermore, it is additionally possible to configure it such that pausing, fast-forwarding, and rewinding of content playback is linked to match pausing, fast-forwarding, and backward scrolling of the scrolling graphs 111a and 111b.

Also, a service provider may later analyze user response to a service such as content or an event, and utilize the analysis results. For example, a service provider may use analysis results to automate or streamline the organization of user opinions gathered at a call center.

Furthermore, in the case where the posting subject is content, it is also possible to use a post count trend graph to conduct editing, such as taking clips of only the exciting scenes in that content.

At this point, a content editing process executed by the information processing apparatus 13 will be described with reference to the flowchart in FIG. 15.

Note that the following describes the case of editing video content consisting of scenes 1 to 10, with a post count trend graph that trends as illustrated in FIG. 16. Also, the video content to be edited is assumed to be recorded in the recording medium 23.

Furthermore, it is also possible for a client 12 to specify the content to be edited, for example.

In step S61, the counting unit 26 counts, for each class, the number of posts regarding the content being edited. Specifically, the counting unit 26 counts the number of positive posts and the number of negative posts regarding the content per a given unit of time (per 1 minute, for example), on the basis of analysis results data for the post counts regarding the video content being edited. The counting unit 26 informs the graph generator 27 of the counting results.

In step S62, a graph illustrating time-wise trends in the post count for each class is generated, similarly to the operation in step S6 of FIG. 2. The graph generator 27 supplies data indicating the generated graph to the content editor 30.

In step S63, the content editor 30 extracts portions of the content satisfying a given condition, on the basis of the post count trend graph.

For example, the content editor 30 may extract, from the video content being edited, scenes that include periods in which the rate of change of the magnitude of change in the positive post count or the negative post count is equal to or greater than a given threshold value, as well as periods in which positive post count or the negative post count is equal to or greater than a given threshold value. Thus, the scenes 3, 4, and 7 to 10 that include the periods T11 and T12 in FIG. 16 are extracted, for example.

For example, in the period T11, the positive post count and the negative post count increase greatly and near-synchronously, and approach peaks. Consequently, the scene for the period T11 is anticipated to be a controversial, problematic scene.

Also, in the period T12, the positive post count increases greatly and approaches a peak, but afterwards the negative post count increases greatly and approaches a peak, as though the two swapped places. Consequently, the scene for the period T12 is anticipated to be a letdown scene in which viewer response drastically changes from positive to negative.

Then, by extracting the scenes 3, 4, and 7 to 10 that include the period T11 and the period T12, it is possible to extract exciting scenes from the video content being edited.

In step S64, the content editor 30 joins the extracted portions to generate a digest of the content. In the case of this example, a digest of video content is generated by joining the scenes 3, 4, and 7 to 10 in order.

In step S65, the content editor 30 transmits the digest of the content via the transmitter 31 and the network 14 to a recipient client 12.

The recipient client 12 plays back the received digest of the content. Thus, a user is able to rapidly view only the exciting scenes in video content.

After that, the content editing process ends.

However, it may also be configured such that clips are taken of only scenes with a large positive post count or only scenes with a large negative post count. Thus, it becomes possible for a user to rapidly view only the scenes with a good response or only the scenes with a bad response.

Furthermore, although an example of editing video content was given in the above description, it is also possible to edit other types of content. For example, by editing audio content such as music or radio broadcasts according to a similar method, it becomes possible to rapidly listen to only the exciting parts of a song or radio broadcast.

<2. Modifications>

(Modifications of Function Assignments)

Herein, the assignment of functions to the servers 11, the clients 12, and the information processing apparatus 13 discussed above is one example thereof, and arbitrary changes are possible.

For example, it may also be configured such that analysis of posts input by users is conducted at the clients 12, with the analysis results being provided to the servers 11 or the information processing apparatus 13.

Also, it may be configured such that the information processing apparatus 13 does not analyze content features and instead acquires data indicating content feature analysis results from a server 11 acting as the delivery source, for example.

Figure 15:
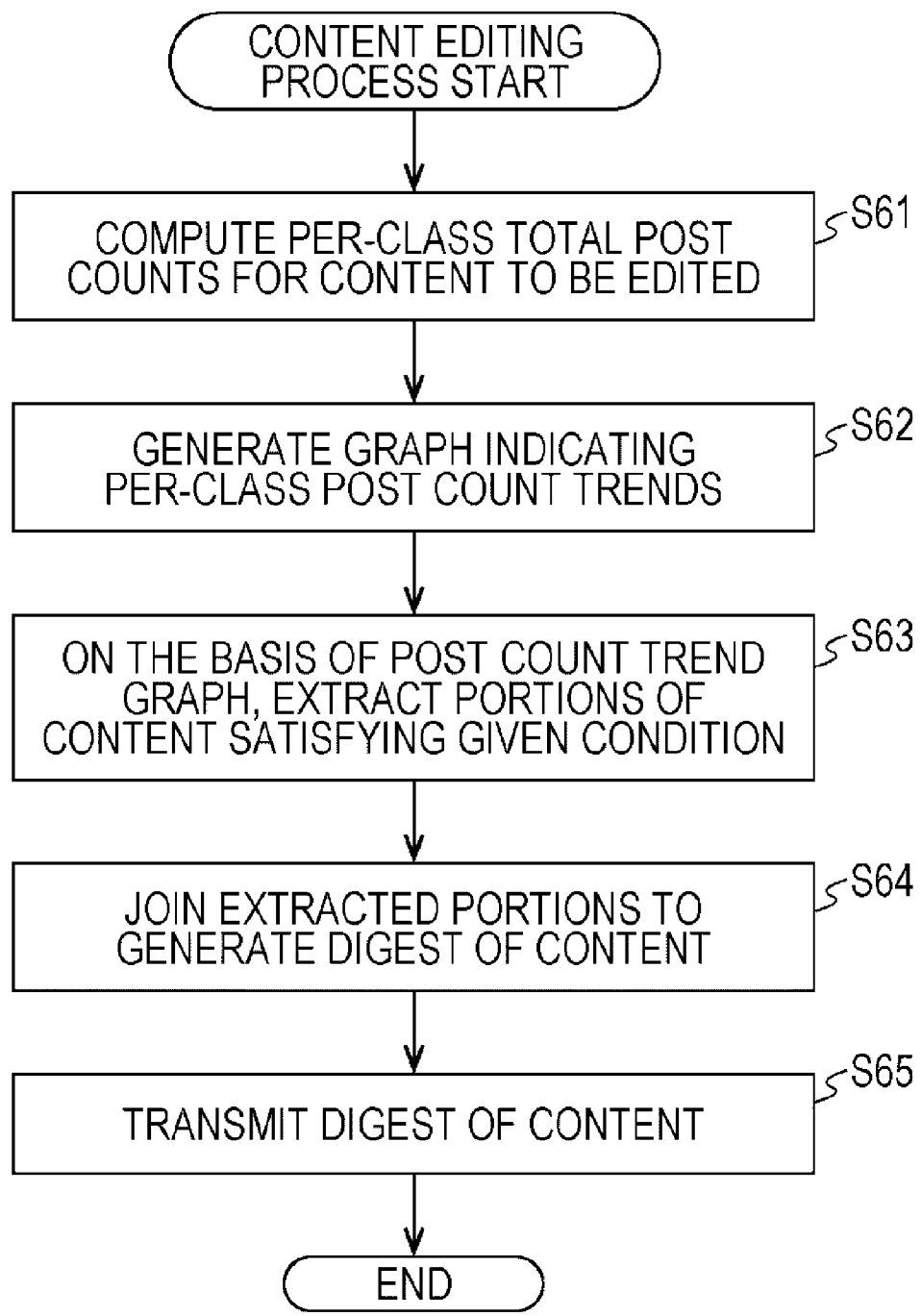
FIG. 15 is a flowchart for explaining a content editing process.

Furthermore, in the content editing process in FIG. 15, it may be configured such that post count trend graph data is provided from the information processing apparatus 13 to a client 12, with the client 12 editing content on the basis of the post count trend graph. Alternatively, it may be configured such that the information processing apparatus 13 computes extracted portions of content on the basis of a post count trend graph and provides that data to a client 12, with the client 12 actually joining the extracted portions of the content.

Also, it is possible to configure it such that the post analysis screen discussed above is displayed on the servers 11 or the information processing apparatus 13 rather than the clients 12.

(Post Count Prediction Process)

In addition, it may be configured such that predicted trends in post counts predicted by the predictor 28 are also displayed when displaying a post count trend graph on a client 12.

For example, a user viewing a posting subject may be able to ascertain time periods where it is anticipated that the posting subject will be exciting, on the basis of predicted trends in post counts. Thus, it becomes possible for a user to view the posting subject only during those time periods, for example.

In addition, a service provider who provides a posting subject is able to predict trends in user response to a posting subject and take measures to improve user response to the posting subject on the basis thereof, for example.

(Exemplary Configuration of Computer)

The foregoing series of operations may be executed in hardware, and may also be executed in software. In the case of executing the series of operations in software, a program constituting such software is installed onto a computer. Herein, the term computer includes computers built into special-purpose hardware, as well as computers able to execute various functions by installing various programs thereon, such as general-purpose personal computers, for example.

FIG. 17 is a block diagram illustrating an exemplary hardware configuration of a computer that executes the foregoing series of operations according to a program.

In the computer, a CPU (Central Processing Unit) 401, ROM (Read-Only Memory) 402, and RAM (Random Access Memory) 403 are connected to each other by a bus 404.

Also connected to the bus 404 is an input/output interface 405. Connected to the input/output interface 405 are an input unit 406, an output unit 407, a storage unit 408, a communication unit 419, and a drive 410.

The input unit 406 comprises devices such as a keyboard, mouse, and microphone. The output unit 407 comprises devices such as a display and speakers. The storage unit 408 comprises devices such as a hard disk and non-volatile memory. The communication unit 419 comprises devices such as a network interface. The drive 410 drives a removable medium 411 such as a magnetic disk, an optical disc, a magneto-optical disc, or semiconductor memory.

In a computer configured as above, the foregoing series of operations are conducted due to the CPU 401 loading a program stored in the storage unit 408 into the RAM 403 via the input/output interface 405 and the bus 404, and executing the program, for example.

A program executed by the computer (CPU 401) may be provided by being recorded onto a removable medium 411 as an instance of packaged media, for example. In addition, the program may be provided via a wired or wireless transmission medium such as a local area network, the Internet, or digital satellite broadcasting.

In the computer, a program may be installed onto the storage unit 408 via the input/output interface 405 by loading a removable medium 411 into the drive 410. A program may also be received by the communication unit 419 via a wired or wireless transmission medium, and installed onto the storage unit 408. Otherwise, a program may be preinstalled in the ROM 402 or the storage unit 408.

Note that a program executed by a computer may be a program in which operations are conducted in a time series following the order described in this specification, but may also be a program in which operations are conducted in parallel or at required timings, such as upon being called.

Also, in this specification, the term system is taken to mean the totality of an apparatus composed of a plurality of apparatus, means, or other components.

Furthermore, embodiments of the present technology are not limited to the foregoing embodiments, and various modifications are possible within a scope that does not depart from the principal matter of the present technology.

In addition, the present technology may also take configurations like the following, for example.

(1) An information processing apparatus comprising:
a collector that collects posts regarding a posting subject that proceeds over time;
a counting unit that counts a number of collected posts for each of different classes of posts; and
a display controller that causes a plurality of graphs to be displayed along a time-axis illustrating time-wise trends in the posts for each class together with additional information, said additional information being information that includes at least one of posts at respective times and information regarding the posting subject.

(2). The information processing apparatus of (1), wherein
the additional information includes a scene image of a video, and
the display controller causes the scene image to be displayed at a peak of at least one of the plurality of graphs.

(3). The information processing apparatus of (1), wherein
the display controller causes a 3D image to be displayed, and the time axis of the plurality of graphs is set in a depth direction of the 3D image.

(4). The information processing apparatus of (1), wherein,
the display controller causes a time-wise trend in a positive post count to be displayed, and a time-wise trend in a negative post count to be displayed, and includes a number of posts that include a predetermined keyword or a post feature or attribute of a post as a condition for being included, said positive post count includes posts indicating a positive commentary, and said negative post counts includes posts indicating a negative commentary.

(5). The information processing apparatus of (1), further comprising:
a content editor that generates a content digest of content segments that occur during periods of time when a rate of change of a time-wise trend exceeds a predetermined threshold.

(6). The information processing apparatus of (1), further comprising:
a content analyzer that analyzes features of content associated with the posts, and provides input to said display controller that displays a graph of time-based trends in features of the content.

(7). The information processing apparatus of (6), wherein
a first feature of content is an audio feature, and
a second feature of content is a video feature.

(8). The information processing apparatus of (1), further comprising:
an interface that sends an analysis request to a remote device have a content analyzer that analyzes features of content associated with the posts, and provides post analysis and features of content to the display controller, wherein
the display controller causes a graph to be displayed of time-based trends in the features of the content.

(9). The information processing apparatus of (8), wherein
a first feature of content is an audio feature, and
a second feature of content is a video feature.

(10). The information processing device of (1), wherein
said additional information is one of image data, text data and video data.

(11). The information processing device of (1), wherein:
the display controller updates the additional information during a post analysis interval during which posts for a particular topic are collected.

(12). The information processing device of (1), wherein:
the display controller causes a displayed scrolling of at least one graph laterally as time advances to provide an opportunity for real time monitoring of responses to content and changing of content based on a time-wise trend to the posting subject.

(13). An information processing apparatus comprising:
a communications interface that exchanges information with a remote source, said information including posts collected regarding a posting subject that proceeds over time;
a post analyzer that classifies posts into different classes of posts and sends an analysis result to the remote source for displaying along a time axis a plurality of graphs illustrating time-wise trends in post count for each class together with additional information, said additional information being information that includes at least one from among posts at respective times and information regarding the posting subject.

(14). The information processing apparatus of (13), further comprising:
a content analyzer that analyzes features of content associated with the posts, and provides post analysis and features of content to the remote source via the communications interface.

(15). The information processing apparatus of (14), wherein
a first feature of content is an audio feature, and
a second feature of content is a video feature.

(16). The information processing apparatus of (13), further comprising:
an editor that extracts portions of the content of the posting subject satisfying a given condition based the plurality of graphs and generates content from the portions extracted.

(17). An information processing method comprising:
collecting posts regarding a posting subject that proceeds over time;
counting a number of collected posts for each of different classes of posts; and
controlling a display controller to display along a time axis a plurality of graphs illustrating time-wise trends in the post count for each class together with additional information, said additional information being information that includes at least one from among posts at respective times and information regarding the posting subject.

(18). An information processing method comprising:
receiving posts regarding a posting subject that proceeds over time and additional information;
analyzing the posts and categorizing respective posts into different classes of posts; determining a number of collected posts as a post count for each of the different classes of posts;
transmitting an analysis result to a remote device that causes a display along a time axis a plurality of graphs illustrating time-wise trends in the post count together with additional information, said additional information being information that includes at least one from among posts at respective times and information regarding the posting subject.

(19). A non-transitory computer readable medium having instructions stored thereon that when executed by a processing circuit performs an information processing method, the method comprising:
collecting posts regarding a posting subject that proceeds over time;

counting the number of collected posts for each of different classes of posts;

controlling a display controller to display along a time axis a plurality of graphs illustrating time-wise trends in the post count for each class together with additional information, said additional information being information that includes at least one from among posts at respective times and information regarding the posting subject.

(20). A non-transitory computer readable medium having instructions stored thereon that when executed by a processing circuit performs an information processing method, the method comprising:

receiving posts regarding a posting subject that proceeds over time and additional information;

analyzing the posts and categorizing respective posts into different classes of posts; determining a number of collected posts as a post count for each of the different classes of posts;

transmitting an analysis result to a remote device that displays along a time axis a plurality of graphs illustrating time-wise trends in the post count together with additional information, said additional information being information that includes at least one from among posts at respective times and information regarding the posting subject.

REFERENCE SIGNS LIST 1 information processing system
11 server
12 client
13 information processing apparatus
22 collector
24 post analyzer
25 content analyzer
26 counting unit
27 graph generator
28 predictor
29 display controller
30 content editor

The invention claimed is:

1. An information processing apparatus comprising: circuitry configured to
collect posts regarding a posting subject that proceeds over time;
count a number of collected posts for each of different classes of posts;
display a plurality of graphs along a time-axis illustrating time-wise trends in the number of collected posts for each class together with additional information, said additional information being information that includes at least one of the collected posts at a respective time in a respective graph, wherein the additional information includes scene image of a video related to the at least one of the collected posts; and
display the scene image at the respective time in the respective graph in response to the number of collected posts for the respective graph reaching a threshold.

2. The information processing apparatus of claim 1, wherein the circuitry displays a 3D image, and the time axis of the plurality of graphs is set in a depth direction of the 3D image.

3. The information processing apparatus of claim 1, wherein,
the circuitry displays a time-wise trend in a positive post count, and displays a time-wise trend in a negative post count, and includes a number of collected posts that include a predetermined keyword or a post feature or attribute of a post as a condition for being included, said positive collected post count includes collected posts indicating a positive commentary, and said negative post counts includes collected posts indicating a negative commentary.

4. The information processing apparatus of claim 1, wherein the circuitry is further configured to:
generate a content digest of content segments that occur during periods of time when a rate of change of a time-wise trend exceeds a predetermined threshold.

5. The information processing apparatus of claim 1, wherein the circuitry is further configured to:
analyze features of content associated with the collected posts, and display a graph of time-based trends in features of the content.

6. The information processing apparatus of claim 5, wherein
a first feature of content is an audio feature, and
a second feature of content is a video feature.

7. The information processing apparatus of claim 1, wherein the circuitry is further configured to:
send an analysis request to a remote device configured to analyze features of content associated with the collected posts, and
display post analysis and a graph of time-based trends in the features of the content received from the remote device.

8. The information processing apparatus of claim 7, wherein
a first feature of content is an audio feature, and
a second feature of content is a video feature.

9. The information processing device of claim 1, wherein said additional information is at least one of image data, text data and video data.

10. The information processing device of claim 1, wherein the circuitry is further configured to:
update the additional information during a post analysis interval during which posts for a particular topic are collected.

11. The information processing device of claim 1, wherein the circuitry is further configured to:
display scrolling of at least one graph laterally as time advances to provide an opportunity for real time monitoring of responses to content and changing of content based on a time-wise trend to the posting subject.

12. The information processing apparatus of claim 1, wherein the plurality of graphs further illustrate corrective measures taken with respect to the posting subject in response to the captured time-wise trends in the collected posts.

13. An information processing apparatus comprising:
circuitry configured to
exchange information with a remote source, said information including posts collected regarding a posting subject that proceeds over time;
classify the collected posts into different classes of collected posts and send an analysis result to the remote source for displaying along a time axis a plurality of graphs illustrating time-wise trends in collected post count for each class together with additional information, said additional information being information that includes at least one from among a collected posts at a respective time in a respective graph, wherein the additional information includes scene image of a video related to the at least one of the collected posts; and display the scene image at the respective time in the respective graph in response to the number of collected posts for the respective graph reaching a threshold.

14. The information processing apparatus of claim 13, wherein the circuitry is further configured to:
analyze features of content associated with the collected posts, and provide post analysis and features of content to the remote source.

15. The information processing apparatus of claim 14, wherein
a first feature of content is an audio feature, and
a second feature of content is a video feature.

16. The information processing apparatus of claim 13, wherein the circuitry is further configured to:
extract portions of the content of the posting subject satisfying a given condition based the plurality of graphs and generate content from the portions extracted.

17. An information processing method comprising:
collecting, with circuitry, posts regarding a posting subject that proceeds over time;
counting, with the circuitry, a number of collected posts for each of different classes of posts;
displaying along a time axis a plurality of graphs illustrating time-wise trends in the collected post count for each class together with additional information, said additional information being information that includes at least one from among collected posts at a respective time in a respective graph, wherein the additional information includes scene image of a video related to the at least one of the collected posts of the additional information; and
displaying the scene image at the respective time in the respective graph in response to the number of collected posts for the respective graph reaching a threshold.

18. An information processing method comprising:
receiving, with circuitry, posts regarding a posting subject that proceeds over time and additional information;
analyzing, with the circuitry, the posts and categorizing respective posts into different classes of posts;
determining, with the circuitry, a number of collected posts as a post count for each of the different classes of posts;
transmitting, with the circuitry, an analysis result to a remote device that causes a display along a time axis a plurality of graphs illustrating time-wise trends in the post count together with additional information, said additional information being information that includes at least one from among collected posts at a respective time in a respective graph, wherein the additional information includes scene image of a video related to the at least one of the collected posts; and
displaying the scene image at the respective time in the respective graph in response to the number of collected posts for the respective graph reaching a threshold.

19. A non-transitory computer readable medium having instructions stored thereon that when executed by a processing circuit performs an information processing method, the method comprising:
collecting posts regarding a posting subject that proceeds over time;
counting the number of collected posts for each of different classes of collected posts;
displaying along a time axis a plurality of graphs illustrating time-wise trends in the post count for each class together with additional information, said additional information being information that includes at least one from among collected posts at respective a respective times time in a respective graph, wherein the additional information includes scene image of a video related to the at least one of the collected posts; and
displaying the scene image at the respective time in the respective graph in response to the number of collected posts for the respective graph reaching a threshold.

20. A non-transitory computer readable medium having instructions stored thereon that when executed by a processing circuit performs an information processing method, the method comprising:
receiving posts regarding a posting subject that proceeds over time and additional information;
analyzing the posts and categorizing respective posts into different classes of posts;
determining a number of collected posts as a post count for each of the different classes of collected posts;
transmitting an analysis result to a remote device that displays along a time axis a plurality of graphs illustrating time-wise trends in the post count together with additional information, said additional information being information that includes at least one from among collected posts at a respective time in a respective graph, wherein the additional information includes scene image of a video related to the at least one of the collected posts of the additional information; and
displaying the scene image at the respective time in the respective graph in response to the number of collected posts for the respective graph reaching a threshold.

* * * * *